(12) United States Patent
Koide

(10) Patent No.: US 12,078,900 B2
(45) Date of Patent: Sep. 3, 2024

(54) DISPLAY DEVICE

(71) Applicant: Japan Display Inc., Tokyo (JP)

(72) Inventor: Gen Koide, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/348,616

(22) Filed: Jul. 7, 2023

(65) Prior Publication Data

US 2023/0350252 A1    Nov. 2, 2023

Related U.S. Application Data

(63) Continuation of application No. PCT/JP2021/046791, filed on Dec. 17, 2021.

(30) Foreign Application Priority Data

Jan. 7, 2021    (JP) .................................. 2021-001468

(51) Int. Cl.
*G02F 1/1362*    (2006.01)
*G02F 1/1368*    (2006.01)

(52) U.S. Cl.
CPC ...... *G02F 1/136286* (2013.01); *G02F 1/1368* (2013.01)

(58) Field of Classification Search
CPC .................................................... G02F 1/1362
See application file for complete search history.

(56) References Cited

U.S. PATENT DOCUMENTS

| 2016/0266451 | A1  | 9/2016  | Koide et al.              |
|--------------|-----|---------|---------------------------|
| 2016/0300863 | A1  | 10/2016 | Koide et al.              |
| 2018/0233076 | A1* | 8/2018  | Miyanaga ......... G09G 3/3688 |
| 2018/0259802 | A1* | 9/2018  | Koide ............... G02F 1/133514 |
| 2020/0004090 | A1* | 1/2020  | Yoshida ............... G02F 1/1362 |
| 2020/0234674 | A1* | 7/2020  | Tominaga ............ G09G 3/2096 |
| 2021/0124196 | A1* | 4/2021  | Miyamoto ........ G02F 1/136286 |
| 2021/0132434 | A1* | 5/2021  | Hyodo .................. G02F 1/1335 |
| 2021/0173245 | A1* | 6/2021  | Kurasawa ............. G06F 3/0412 |

FOREIGN PATENT DOCUMENTS

| JP | 2016-170293 A | 9/2016 |
| JP | 2016-200659 A | 12/2016 |

* cited by examiner

*Primary Examiner* — Sang V Nguyen
(74) *Attorney, Agent, or Firm* — Maier & Maier, PLLC

(57) ABSTRACT

According to one embodiment, in the frame region, a second portion of each signal line is provided between a display region and a switch circuit, and is drawn from the switch circuit toward the display region, a first portion of the signal line is formed by a second wiring layer, provided between the second portion and the display region, and connected to the second portion, the second portion of the signal line and each of a plurality of detection lines are formed by a third wiring layer, and the second portions of the plurality of signal lines and the plurality of detection lines are provided approximately parallel to each other.

17 Claims, 26 Drawing Sheets

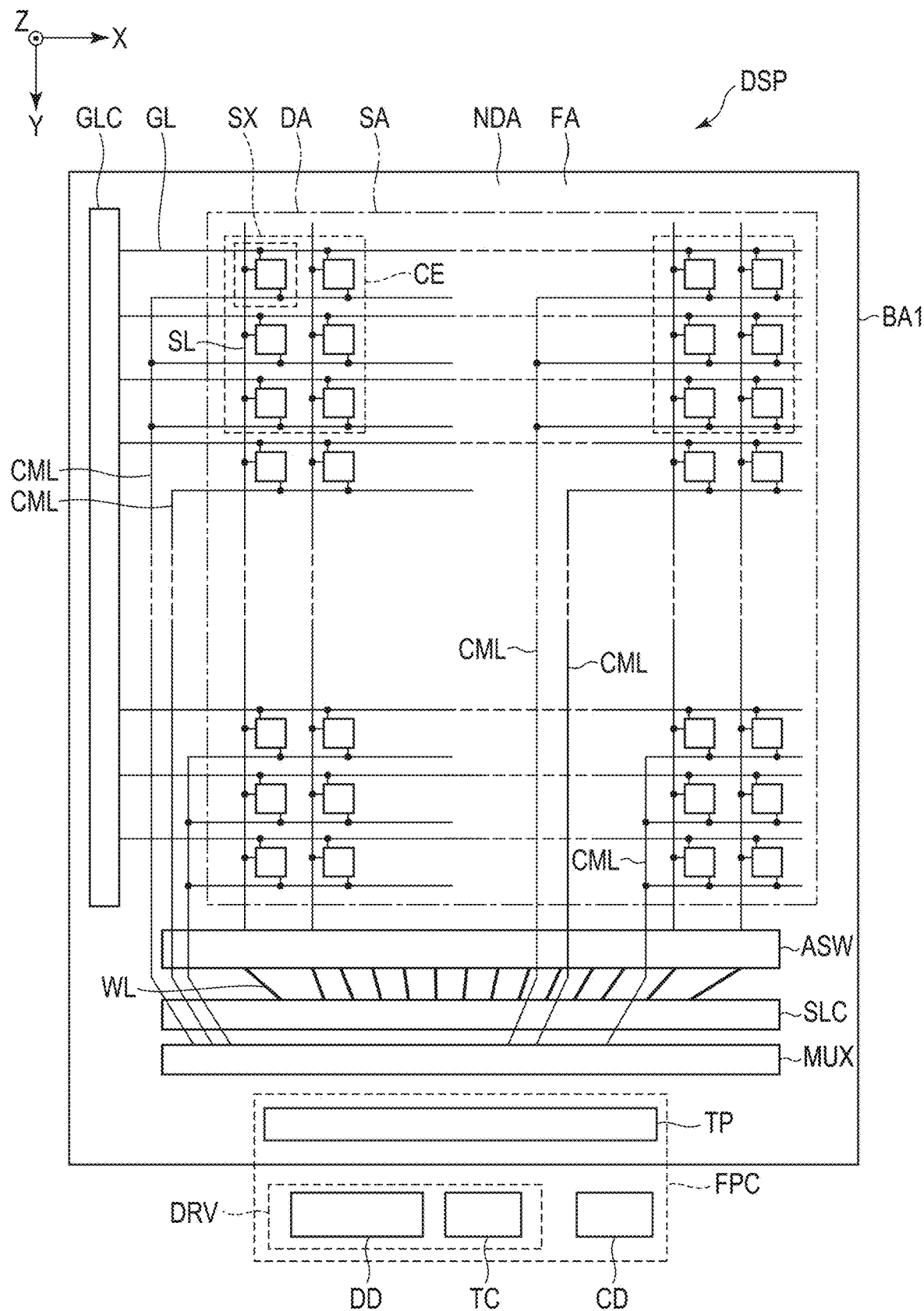
F I G. 1

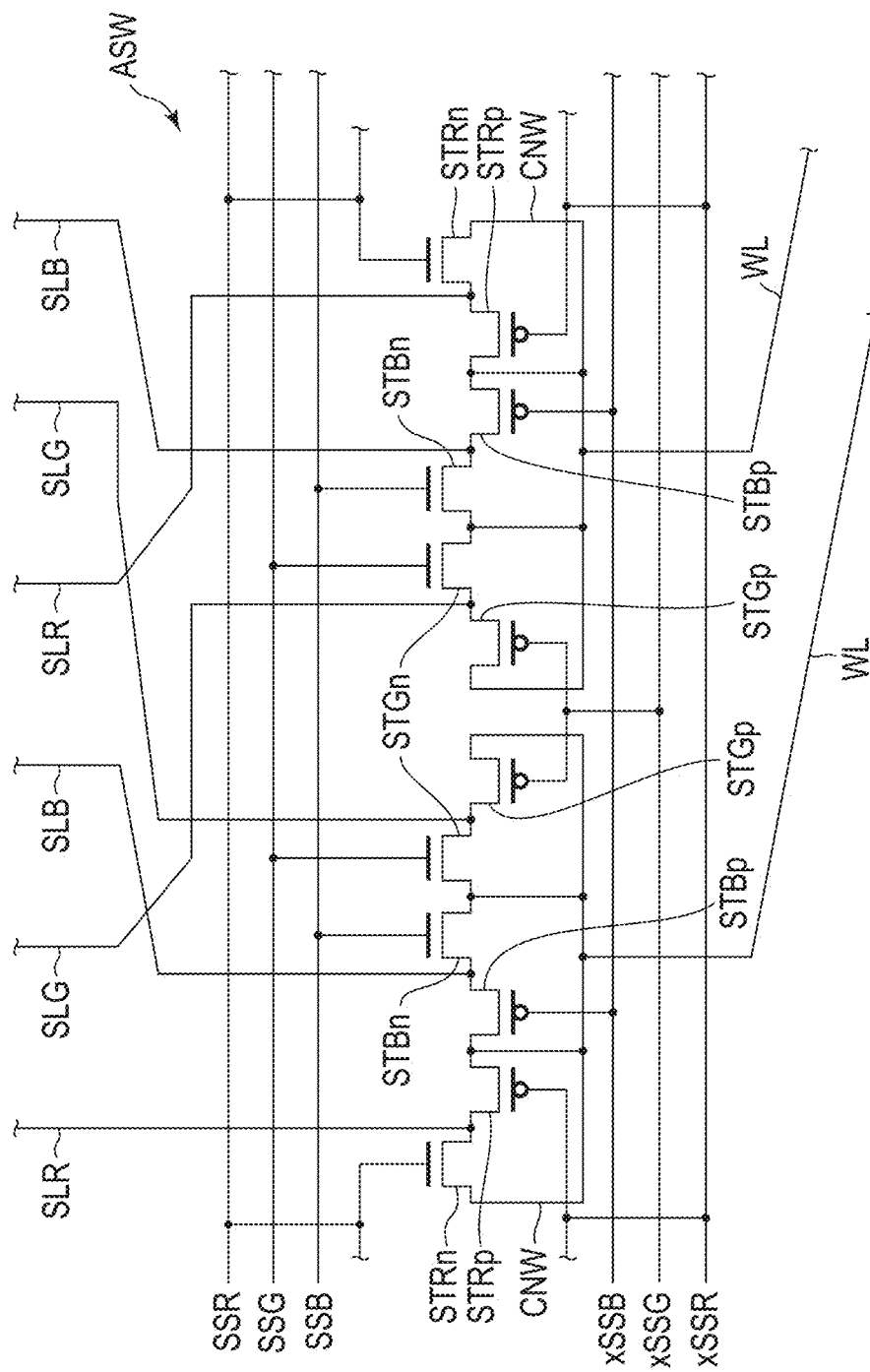
F I G. 4

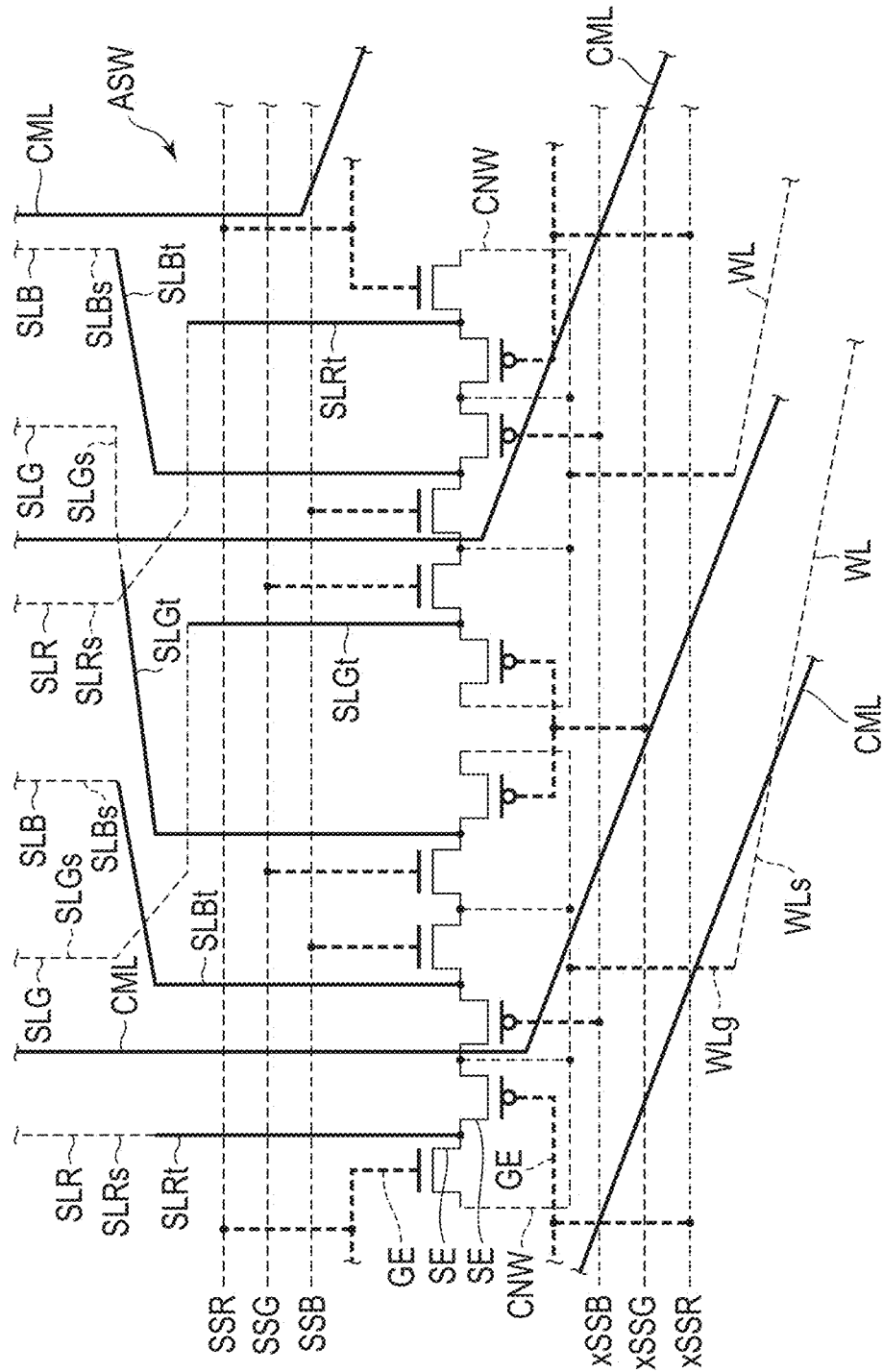
F I G. 7

DISPLAY DEVICE

CROSS-REFERENCE TO RELATED APPLICATIONS

This application is a Continuation Application of PCT Application No. PCT/JP2021/046791, filed Dec. 17, 2021 and based upon and claiming the benefit of priority from Japanese Patent Application No. 2021-001468, filed Jan. 7, 2021, the entire contents of all of which are incorporated herein by reference.

FIELD

Embodiments described herein relate generally to a display device.

BACKGROUND

A display device including a plurality of pixels in a display area has been developed. A plurality of signal lines are required to input image signals to the plurality of pixels. The plurality of signal lines are connected to a terminal portion connected to a drive element or the drive element itself in a non-display area. In order to obtain a display device having a wide display area and a narrow non-display area, i.e., a display device having a narrow frame, an efficient layout of wiring in the non-display area is required.

In addition, in a display device with a touch detection function comprising the display device as described above, a plurality of detection lines for outputting the detection signals from a sensor electrode are arranged in a sensor area which is also the display area. For this reason a plurality of lines such as signal lines and detection lines are densely arranged in the non-display area. Even in such a display device with a touch detection function, an efficient layout of wiring in a non-display area is required to realize a narrow frame.

BRIEF DESCRIPTION OF THE DRAWINGS

FIG. 1 is a schematic plan view showing a display device according to an embodiment.

FIG. 4 is a circuit diagram showing the display device.

FIG. 7 is a circuit diagram showing the signal line switch circuit and the common line of the embodiment.

DETAILED DESCRIPTION

Figure 2:
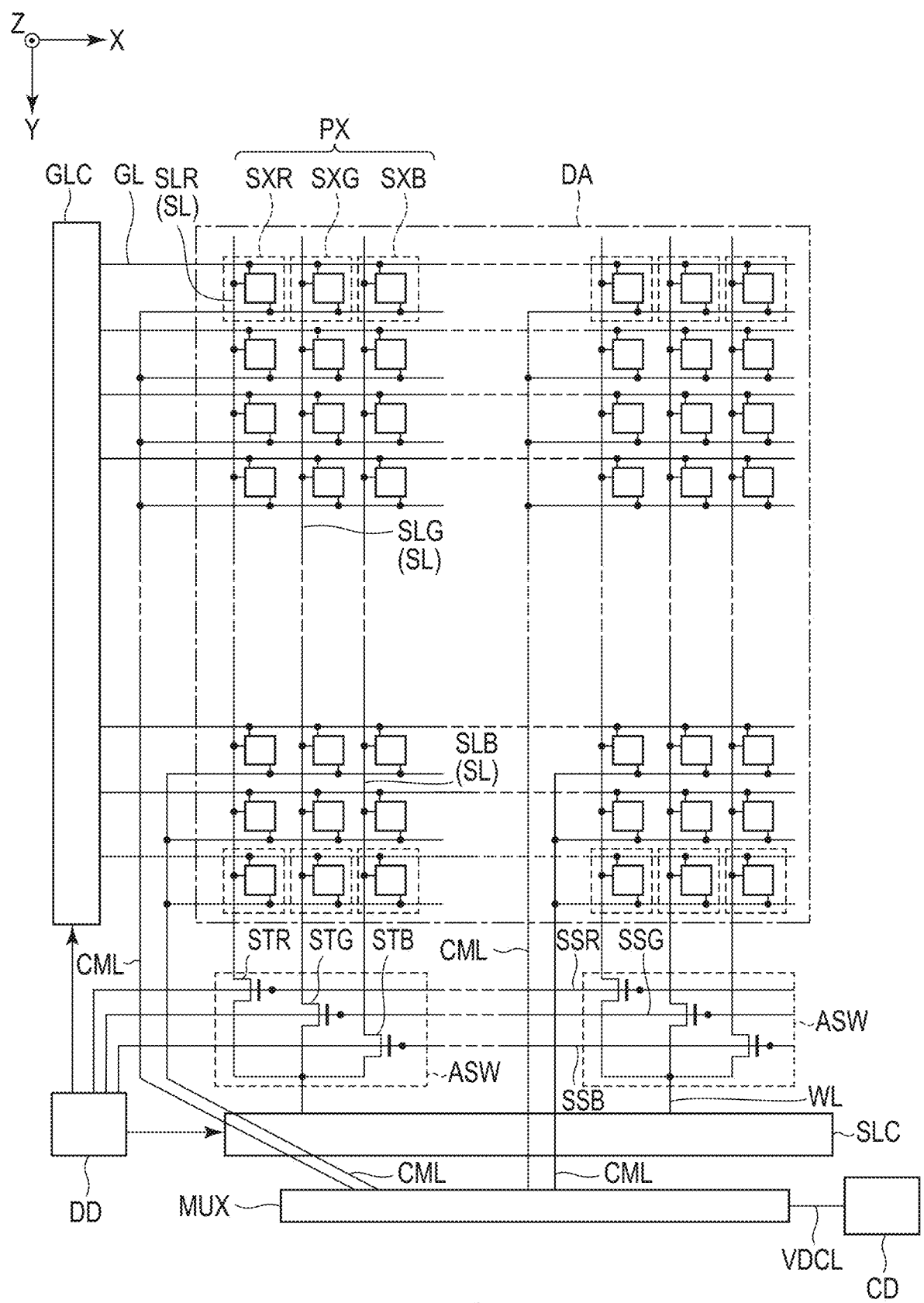
FIG. 2 is a circuit diagram showing a display device.

In general, according to one embodiment, a display device comprises
- a display area and a frame area surrounding the display area, which are provided on a first base;
- a plurality of sub-pixels provided in the display area;
- a plurality of scanning lines provided in the display area, connected to the plurality of sub-pixels, and formed by a first wiring layer;
- a plurality of signal lines provided in the display area, connected to the plurality of sub-pixels, and formed by a second wiring layer;
- a switch circuit provided in the frame area and connected to the plurality of signal lines;
- a plurality of sensor electrodes provided in the display area; and
- a plurality of detection lines connected to the plurality of sensor electrodes and formed by a third wiring layer, wherein
- the plurality of signal lines each includes a first portion and a second portion in the frame area,
- the second portion of the signal line is provided between the display area and the switch circuit, and drawn from the switch circuit toward the display area,
- the first portion of the signal line is formed by the second wiring layer, provided between the second portion and the display area, and connected to the second portion,
- the second portion of the signal line and each of the plurality of detection lines are formed by the third wiring layer, and
- the second portions of the plurality of signal lines and the plurality of detection lines are provided substantially parallel to each other.

In addition, according to another embodiment, a display device comprises a display area and a frame area surrounding the display area, which are provided on a first base;

at least a first pixel, a second pixel, and a third pixel, which are provided in the display area;

a first signal line connected to the first pixel;

a second signal line connected to the second pixel;

a third signal line connected to the third pixel;

a switch circuit provided in the frame area and connected to the first signal line, the second signal line, and the third signal line; and a lead line connected to the switch circuit, wherein the switch circuit includes a first transistor connected to the first signal line, a second transistor connected to the second signal line, and a third transistor connected to the third signal line, the lead line is connected to the first transistor, the second transistor, and the third transistor, each of the first signal line, the second signal line, and the third signal line includes a first portion and a second portion, the lead line includes a third portion and a fourth portion, the fourth portion of the lead line is formed by the first wiring layer, the first portion of each of the first signal line, the second signal line, and the third signal line, and the third portion of the lead line are formed by a second wiring layer located above the first wiring layer with an inorganic insulating layer sandwiched therebetween, and the second portion of each of the first signal line, the second signal line, and the third signal line is formed by a third wiring layer located above the second wiring layer with an organic insulating layer sandwiched therebetween.

According to yet another embodiment, a display device comprises a plurality of sensor electrodes arrayed in a matrix in a display area;

a common line connected to each of the plurality of sensor electrodes;

a plurality of signal lines arranged in a first direction in a display area; and an analog switch circuit provided in a frame area surrounding the display area and connected to the plurality of signal lines, wherein a first signal line that is one of the plurality of signal lines includes a first portion and a second portion in the frame area, the second portion is connected to a drain of a transistor included in the analog switch circuit and drawn toward the display area, the first portion is located between the second portion and the display area and connected to the second portion, the second portion is a wiring portion formed of a same material in a same layer as the common line, and the first portion is a wiring portion formed of a same material in a same layer as a plurality of signal lines in the display area.

Embodiments described herein aim to provide a display device having display quality improved.

Embodiments will be described hereinafter with reference to the accompanying drawings. The disclosure is merely an example, and proper changes within the spirit of the invention, which are easily conceivable by a person of ordinary skill in the art, are included in the scope of the invention as a matter of course. In addition, in some cases, in order to make the description clearer, the widths, thicknesses, shapes and the like, of the respective parts are schematically illustrated in the drawings, compared to the actual modes. However, the schematic illustration is merely an example, and adds no restriction to the interpretation of the invention. Besides, in the specification and drawings, the same elements as those described in connection with preceding drawings are denoted by like reference numbers, and a detailed description thereof is omitted unless necessary.

The embodiments described herein are not general embodiments, but embodiments in which the same or corresponding special technical features of the invention are described. A display device according to one of the embodiments will be described hereinafter with reference to the accompanying drawings.

In the present embodiment, a first direction X, a second direction Y, and a third direction Z are orthogonal to each other, but may intersect at an angle other than 90 degrees. A direction toward a tip of an arrow of the third direction Z is referred to as an upper or upward direction, and a direction opposite to the direction toward the tip of the arrow of the third direction Z is referred to as a lower or downward direction.

In addition, according to "a second member above a first member" and "a second member below a first member", the second member may be in contact with the first member or may be located separately from the first member. In the latter case, a third member may be interposed between the first member and the second member. In contrast, according to "a second member on a first member" and "a second member under a first member", the second member is in contact with the first member.

In addition, an observation position at which the display device is to be observed is assumed to be located on the tip side of the arrow of the third direction Z, and viewing from the observation position toward an X-Y plane defined by the first direction X and the second direction Y is referred to as plan view. Viewing a cross-section of the display device on an X-Z plane defined by the first direction X and the third direction Z or a Y-Z plane defined by the second direction Y and the third direction Z is referred to as cross-sectional view.

Embodiment

FIG. 1 is a schematic plan view showing a display device according to an embodiment. The display device DSP shown in FIG. 1 has a display area DA and a frame area FA which is a non-display area NDA, on a base BA1. In the present embodiment, the frame area FA is an area different from the display area DA, and is formed in a frame shape so as to surround the display area DA.

As shown in FIG. 1, the display device DSP comprises the base BA1, a plurality of sub-pixels SX arrayed in a matrix above the base BA1 in the display area DA, a plurality of scanning lines GL, and a plurality of signal lines SL. Each of the plurality of sub-pixels SX is provided at an intersection of each of the scanning lines GL and each of the signal lines SL. The scanning line and the signal line are also referred to as a gate line and a source line, respectively. In addition, the base BA1 and a base BA2 to be described later are also referred to as a first base and a second base, respectively.

A liquid crystal display device will be described as an example of the display device DSP of the present embodiment, but the present embodiment is not limited to this. The display device DSP of the present embodiment can also be applied to an electrophoretic display device, an organic Electro-Luminescence (EL) display device, a plasma display device, a Micro-Electro Mechanical System (MEMS) display device, and the like.

In addition, examples of the display mode of the liquid crystal display device include so-called longitudinal electric field mode and lateral electric field mode. The longitudinal electric field mode includes, for example, a Twisted Nematic (TN) mode, a Vertical Alignment (VA) mode, and the like. The lateral electric field mode includes, for example, an In-Plane Switching (IPS) mode, a Fringe Field Switching (FFS) mode that is one of the IPS modes, and the like. In the present embodiment, the lateral electric field mode will be described as an example, but the present embodiment is not limited to this. The present embodiment can also be applied to a display device in the longitudinal electric field mode.

In addition, although the details will be described later, the display device DSP of the present embodiment is a display device with a touch detection function (also simply referred to as a detection function). The display device with a touch detection function includes a display device of an on-cell type (also referred to as an external type) in which the display device and the touch panel implementing the touch detection function are produced separately and the touch panel is stuck to a screen of the display device, and a display device of an in-cell type (also referred to as a built-in type) in which the display device and the touch panel are integrated. The in-cell type display device will be described in the embodiment. However, the present embodiment can also be applied to the on-cell type display device.

In the embodiment, a display device with a capacitive type touch detection function will be described. However, the present embodiment can be applied to not only the touch detection of the capacitive type, but also the touch detection of other types such as the optical type, the resistive type, the capacitive type, and the electromagnetic induction type.

The capacitive type includes a mutual capacitive type (mutual capacitive sensing) for detecting an electrostatic capacitance between the capacitance between two detection electrodes opposed in a state of being separated from each other, and a self capacitive type (self capacitive sensing) for detecting the capacitance between a detection electrode and, for example, a referential potential such as a ground potential. The self capacitive type is described in the present embodiment, but the embodiment can also be applied to a display device that executes touch detection of the mutual capacitive type.

The display device DSP shown in FIG. 1 further includes a scanning line drive circuit GLC for driving the scanning lines GL and a signal line drive circuit SLC for driving the signal lines SL, in the frame area FA. The signal line drive circuit SLC and the scanning line drive circuit GLC are electrically connected to a drive element DD. The drive element DD provided in a controller DRV outputs signals necessary for image display to the sub-pixels SX via the signal line drive circuit SLC and the scanning line drive circuit GLC.

Although the details will be described later, a plurality of lead lines WL electrically connected to the signal lines SL are provided between the signal line drive circuit SLC and the drive element DD.

In addition, the display device DSP includes a common electrode CE and a common line CML in the display area DA. The common electrode CE generates an electric field between the own common electrode and a pixel electrode PE included in the sub-pixel SX, and drives a display function layer, for example, a liquid crystal layer by the electric field. Furthermore, the common electrode CE also functions as a sensor electrode SRE to be described later. The common electrode CE is connected to a common electrode drive circuit CD to which a common voltage (Vcom) is applied via the common line CML. Since the sensor electrode SRE (common electrode CE) is provided in the display area DA, the display area DA is also referred to as a sensor area SA.

A flexible wiring board FPC including a terminal TP, the controller DRV, and the common electrode drive circuit CD is provided on the base BA1. The controller DRV includes the drive element DD and a drive element TC. The drive element DD and the drive element TC are connected to the signal line drive circuit SLC and a switch circuit MUX to be described later via the terminal TP.

Figure 3A:
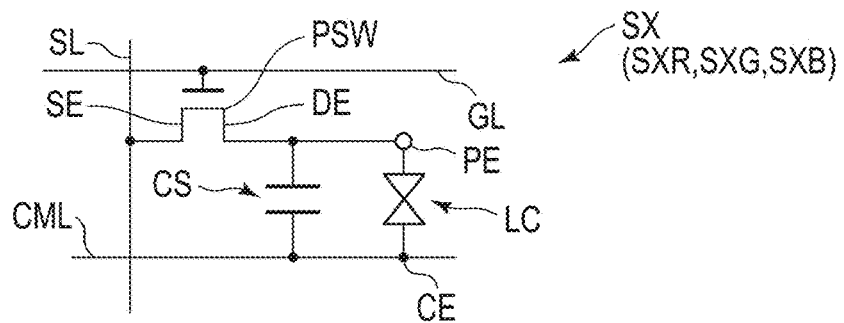
FIG. 3A is a diagram illustrating sub-pixels provided in the display device.
Figure 3B:
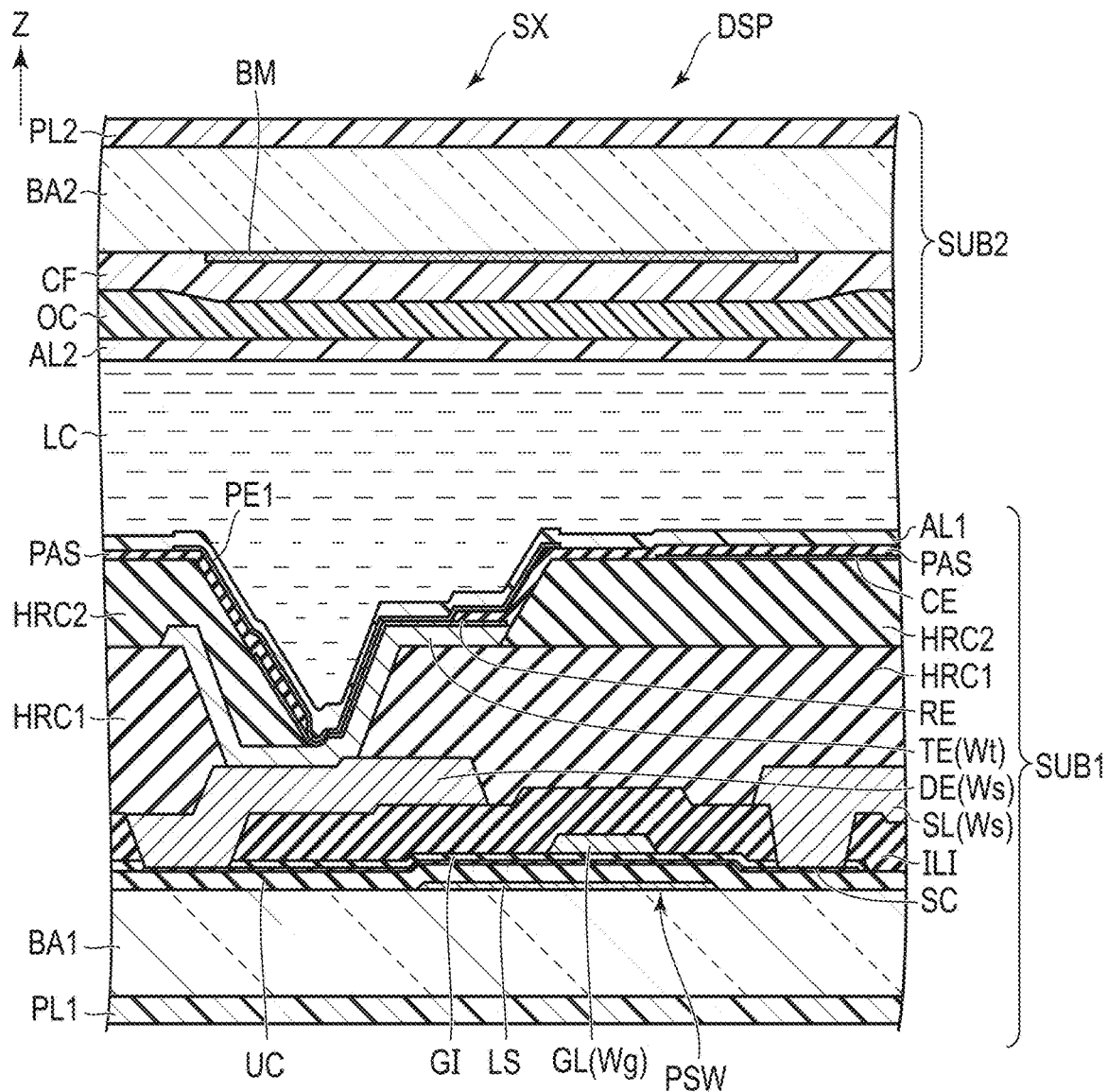
FIG. 3B is a diagram illustrating the sub-pixels provided in the display device.
Figure 5:
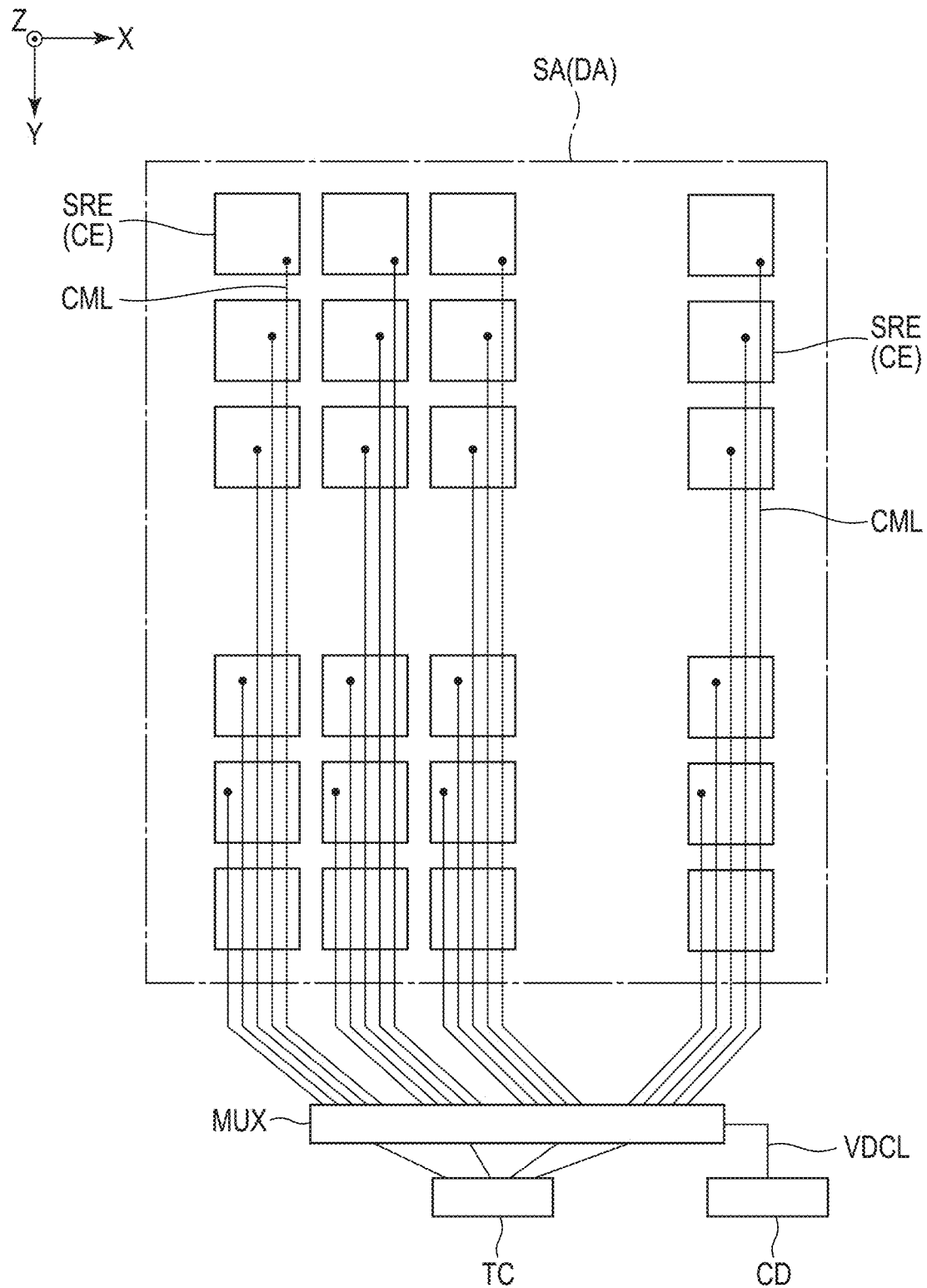
FIG. 5 is a circuit diagram showing the display device.

Each of the constituent members related to the display function and the detection function of the display device DSP of FIG. 1 will be described separately in FIG. 2 to FIG. 4 and FIG. 5, in view of facility of watching the drawings. FIG. 2 and FIG. 5 are circuit diagrams of the display device DSP. In addition, FIG. 3A and FIG. 3B are views illustrating the pixel provided in the display device. FIG. 3A is a circuit diagram of the sub-pixel SX shown in FIG. 2. FIG. 3B is a cross-sectional view of the display device DSP including the sub-pixel SX shown in FIG. 2.

As shown in FIG. 2, the display area DA of the display device DSP includes a plurality of pixels PX. Each of the plurality of pixels PX includes a sub-pixel SXR, a sub-pixel SXG, and a sub-pixel SXB that display the respective colors of R (red), G (green), and B (blue). When the sub-pixel SXR, the sub-pixel SXG, and the sub-pixel SXB are not distinguished, they are simply referred to as sub-pixels SX. As described above, each of the plurality of sub-pixels SX is provided at each intersection of the scanning line GL and the signal line SL. In other words, each of the sub-pixels SX is provided in an area surrounded by two adjacent scanning lines GL and two adjacent signal lines SL.

As shown in FIG. 3A, each sub-pixel SX comprises a switching element PSW, the pixel electrode PE, the common electrode CE, a liquid crystal layer LC and the like. The switching element PSW is constituted by, for example, a thin-film transistor (TFT) and is electrically connected to the scanning line GL and the signal line SL. The scanning line GL is connected to the switching element PSW in each of the sub-pixels SX arranged in the first direction X. The signal line SL is connected to the switching element PSW in each of the sub-pixels SX arranged in the second direction Y. The pixel electrode PE is electrically connected to the switching element PSW. Each of the pixel electrodes PE is opposed to the common electrode CE, and drives the liquid crystal layer LC by the electric field generated between the pixel electrode PE and the common electrode CE as described above. A storage capacitance CS is formed, for example, between the common electrode CE and an electrode of the same potential, and between the pixel electrode PE and an electrode of the same potential.

A source electrode of the switching element PSW of the sub-pixel SX is formed integrally with the signal line SL. In addition, each of the plurality of signal lines SL corresponds to the display data and is connected to the signal line drive circuit SLC to which the video signals supplied to each sub-pixel SX are input. In other words, the plurality of signal lines SL connect the plurality of sub-pixels SX with the signal line drive circuit SLC.

In addition, a gate electrode of the sub-pixel SX is formed integrally with the scanning line GL. In addition, each scanning line GL is connected to the scanning line drive circuit GLC that supplies scanning signals supplied to each sub-pixel SX for one horizontal scanning time.

The relationship in connection between the signal lines SL and the signal line switch circuit ASW will be described with reference to FIG. 2. In the example shown in FIG. 2, a signal line SLR, a signal line SLG, and a signal line SLB are provided as the signal lines SL connected to the respective sub-pixels SX. The signal line SLR, the signal line SLG, and the signal line SLB are connected to the signal line switch circuit ASW. The signal line SLR is a signal line connected to the sub-pixel SXR that displays red (R) color. The signal line SLG is a signal line connected to the sub-pixel SXG that displays green (G) color. The signal line SLB is a signal line connected to the sub-pixel SXB that displays blue (B) color.

More specifically, the signal line SLR is connected to a sub-pixel column including a plurality of sub-pixels SXR aligned in the second direction Y. The signal line SLG is connected to a sub-pixel column including a plurality of sub-pixels SXG aligned in the second direction Y. The signal line SLB is connected to a sub-pixel column including a plurality of sub-pixels SXB aligned in the second direction Y.

The signal line switch circuit ASW is a control circuit that supplies signals related to images to the display area DA serving as a pixel circuit. The signal line switch circuit ASW includes a transistor STR, a transistor STG, and a transistor STB that serve as the switching elements, and a selection line SSR, a selection line SSG, and a selection line SSB. Each of the transistor STR, the transistor STG, and the transistor STB is, for example, a thin film transistor. When the transistor STR, the transistor STG, and the transistor STB do not need to be particularly distinguished, the transistors are simply referred to as transistors ST. In addition, the signal line switch circuit ASW may be simply referred to as a switch circuit.

The transistor STR is connected to the signal line SLR. The transistor STG is connected to the signal line SLG. The transistor STB is connected to the signal line SLB.

The drive element DD shown in FIG. 2 controls the signal line drive circuit SLC, the scanning line drive circuit GLC, and the signal line switch circuit ASW, based on display control signals such as display data, clock signals, and display timing signals transmitted from the outside of the display device.

The transistor STR, the transistor STG, and the transistor STB are controlled to be turned on and off by switch change signals output from the drive element DD via the selection line SSR, the selection line SSG, and the selection lines SSB, respectively. The transistor STR is controlled to be turned on and off by the switch change signal input via the selection line SSR. The transistor STG is controlled to be turned on and off by the switch change signal input via the selection line SSG. The transistor STB is controlled to be turned on and off by the switch change signal input via the selection line SSB.

The drive element DD controls turning on and off the transistor STR, the transistor STG, and the transistor STB of the signal line switch circuit ASW, in accordance with the control of the signal line drive circuit SLC to output a red video signal, a green video signal, and a blue video signal in time division within one horizontal period. In other words, each of the transistors ST (transistor STR, transistor STG, and transistor STB) included in the signal line switch circuit ASW is driven in a time-division manner. More specifically, among the transistors STR, STG, and STB, the video signal from the signal line drive circuit SLC is input to the signal line SL connected to the transistor ST in the on state, of the transistor STR, the transistor STG, and the transistor STB, via the lead line WL. In addition, the drive element DD controls the scanning line drive circuit GLC so as to maintain the ON state of the switching element PSW of the sub-pixel SX to which the video signal is written while the video signal of each color is output.

The signal line switch circuit ASW may be simply referred to as an RGB switch, a time division switch, an analog switch, or a selector. In addition, in the present embodiment, one signal line switch circuit is provided for three signal lines connected to the red, green, and blue sub-pixels, but the signal line switch circuit may be provided for two signal lines connected to two sub-pixels. Alternatively, one signal line switch circuit may be provided for two pixels, i.e., six signal lines connected to six sub-pixels. In this case, the signal line drive circuit outputs the video signals six times in one horizontal period. The number of time division can be arbitrarily set depending on the write status of the video signals to each sub-pixel and the processing capacity of the signal line drive circuit.

In the display period including the above horizontal period, a constant DC voltage is supplied from the common electrode drive circuit CD to the switch circuit MUX via a line VDCL. The switch circuit MUX supplies the constant DC voltage to all the common electrodes CE via the common line CML. As a result, as described above, an electric field for driving the liquid crystal layer LC is generated between the pixel electrode PE and the common electrode CE.

A cross-sectional structure of the display device DSP including the sub-pixel SX will be described with reference to FIG. 3B. A first substrate SUB1 comprises a base BA1, an insulating layer UC, the scanning line GL, the signal line SL, the switching element PSW, an insulating layer HRCT, an insulating layer HRC2, the common electrode CE, an insulating layer PAS, the pixel electrode PE, and an alignment film AL1. The switching element PSW includes a semiconductor layer SC, an insulating layer GI, a gate electrode formed integrally with the scanning line GL, an insulating layer ILI, a source electrode formed integrally with the signal line SL, and a drain electrode DE, and each of them is stacked in this order.

The base BA1 is a light transmissive substrate such as a glass substrate or a flexible resin substrate. The insulating layer UC is located on the base BA1. The insulating layer GI is located on the insulating layer UC. The insulating layer ILI is located on the insulating layer GI.

The insulating layer UC, the insulating layer GI, the insulating layer ILI, and the insulating layer PAS are inorganic insulating layers formed of an inorganic insulating material such as silicon oxide, silicon nitride, and silicon oxynitride. The insulating layer UC, the insulating layer GI, and the insulating layer ILI may have a single-layer structure using the inorganic insulating material or may have a multilayer structure in which the plurality of inorganic insulating materials are stacked.

In contrast, the insulating layer HRC1 and the insulating layer HRC2 are, for example, organic insulating layers formed of an organic insulating material such as acrylic resin.

The organic insulating layer is thicker than the inorganic insulating layer. In other words, it can be said that a distance between the wiring layers provided to be in contact with the upper surface and the lower surface of the organic insulating layer is longer than a distance between the wiring layers provided to be in contact with the upper surface and the lower surface of the inorganic insulating layer.

The semiconductor layer SC is provided on the insulating layer UC. The semiconductor layer SC is formed of, for example, polycrystalline silicon. However, the semiconductor layer SC of the present embodiment is not limited to this. The semiconductor layer SC may be formed of amorphous silicon or an oxide semiconductor.

The scanning line GL is provided on the semiconductor layer SC and the insulating layer GI. The scanning line GL is formed of a metal material such as aluminum (Al), titanium (Ti), silver (Ag), molybdenum (Mo), tungsten (W), copper (Cu) or chromium (Cr) or an alloy obtained by combining the metal materials and may have a single-layer structure or a multilayer structure. As an example, the scanning line GL is formed of a molybdenum tungsten alloy. In the present embodiment, the wiring layer in the same layer as the scanning line GL is referred to as a first wiring layer Wg. In addition, the first wiring layer Wg may be referred to as a scanning line layer, a gate layer, or a GL layer. Alternatively, the first wiring layer Wg may be referred to as a first metal layer.

The signal line SL is located on the insulating layer ILI. The signal line SL is connected to the semiconductor layer SC via contact holes provided in the insulating layer GI and the insulating layer ILI. The signal line SL is formed of a metal material such as aluminum (Al), titanium (Ti), silver (Ag), molybdenum (Mo), tungsten (W), copper (Cu) or chromium (Cr) or an alloy obtained by combining the metal materials and may have a single-layer structure or a multilayer structure. As an example, the signal line SL is a stacked layer body formed by stacking a first layer containing titanium (Ti), a second layer containing aluminum (Al), and a third layer containing titanium (Ti) in this order. In the present embodiment, the wiring layer in the same layer as the signal line SL is referred to as a second wiring layer Ws. In addition, the second wiring layer Ws may be referred to as a signal line layer, a Sig layer, or an SL layer. Alternatively, the second wiring layer Ws may be referred to as a second metal layer.

The drain electrode DE is located on the insulating layer ILI. The drain electrode DE is connected to the semiconductor layer SC via contact holes provided in the insulating layers GI and ILI. The drain electrode DE is formed by the second wiring layer Ws.

The insulating layer HRC1 covers the signal line SL, the drain electrode DE, and the insulating layer ILI. A lead electrode TE is provided on the insulating layer HRC1 and is connected to the drain electrode DE via a contact hole provided in the insulating layer HRC1.

The lead electrode TE is formed of the above-described metal material, an alloy formed of a combination of the above-described metal materials, or the like, and may have a single-layer structure or a multilayer structure. As one example, the lead electrode TE is a stacked layer body formed by stacking a first layer containing titanium (Ti), a second layer containing aluminum (Al), and a third layer containing titanium (Ti) in this order or a stacked layer body formed by stacking a first layer containing molybdenum (Mo), a second layer containing aluminum (Al), and a third layer containing molybdenum (Mo) in this order. The lead electrode TE is formed by a wiring layer in the same layer as the common line CML. In the present embodiment, the wiring layer in the same layer as the common line CML is referred to as a third wiring layer Wt. In addition, the third wiring layer Wt may be referred to as a common wiring layer, a COM layer, or a TL layer. Alternatively, the third wiring layer Wt may be referred to as a third metal layer.

The insulating layer HRC2 is provided to cover the insulating layer HRC1 and the lead electrode TE.

The common electrode CE and a relay electrode RE are provided on the insulating layer HRC2, the relay electrode RE is located at an opening portion of the common electrode CE, and the common electrode CE and the relay electrode RE are separated from each other.

The relay electrode RE is located on the insulating layer HRC2. The relay electrode RE is in contact with the lead electrode TE via a contact hole formed in the insulating layer HRC1, at a position overlapping with the lead electrode TE. The relay electrode RE is a transparent electrode formed of a transparent conductive material such as indium tin oxide (ITO) or indium zinc oxide (IZO).

The insulating layer PAS covers the common electrode CE and the relay electrode RE.

The pixel electrode PE is located on the insulating layer PAS. In addition, the pixel electrode PE is covered with the alignment film AL1. In other words, the pixel electrode PE is provided between the insulating layer PAS and the alignment film AL1. Similarly to the common electrode CE, the pixel electrode PE is a transparent electrode formed of the above-described transparent conductive material.

The pixel electrode PE is connected to the relay electrode RE via a contact hole formed in the insulating layer PAS, and overlaps with the common electrode CE with the insulating layer PAS interposed therebetween.

The alignment film AL1 also covers the insulating layer PAS.

The second substrate SUB2 comprises the base BA2, a light-shielding layer BM, a color filter CF, an overcoat layer OC, and an alignment film AL2.

Similarly to the base BA1, the base BA2 is a light transmissive substrate such as a glass substrate or a resin substrate. The light-shielding layer BM and the color filter CF are located on a side opposed to the first substrate SUB1 of the base BA2.

The color filter CF includes a red color filter CFR, a green color filter CFG, and a blue color filter CFB.

The overcoat layer OC covers the color filter CF. The overcoat layer OC is formed of a transparent resin.

The alignment film AL2 covers the overcoat layer OC. The alignment film AL1 and the alignment film AL2 are formed of, for example, a material exhibiting horizontal alignment properties.

The first substrate SUB1 and the second substrate SUB2 described above are arranged such that the alignment film AL1 and the alignment film AL2 are opposed to each other. The first substrate SUB1 and the second substrate SUB2 are bonded to each other by a seal in a state in which a predetermined cell gap is formed. The liquid crystal layer LC is held between the alignment film AL1 and the alignment film AL2. The liquid crystal layer LC comprises liquid crystal molecules LM. The liquid crystal layer LC is composed of a liquid crystal material of a positive type (having a positive dielectric anisotropy) or a liquid crystal material of a negative type (having a negative dielectric anisotropy).

A polarizer PL1 is bonded to the base BA1. A polarizer PL2 is bonded to the base BA2. The display device may comprise a retardation film, a scattering layer, an antireflective layer, and the like in addition to the polarizer PL1 and the polarizer PL2.

In addition, the display device DSP comprises an illumination device (not shown) below the first substrate SUB1.

FIG. 4 is a more detailed circuit diagram of the signal line switch circuit ASW. In addition, FIG. 4 shows the transistors of the signal line switch circuit ASW at one stage. The signal line switch circuit ASW shown in FIG. 4 includes an n-channel transistor STRn and a p-channel transistor STRp as the transistors STR. The transistors STG include an n-channel transistor STGn and a p-channel transistor STBp. The transistors STB include an n-channel transistor STBn and a p-channel transistor STBp.

When the n-channel transistor STRn, the re-channel transistor STGn, the n-channel transistor STBn, the p-channel transistor STRp, the p-channel transistor STRp, the p-channel transistor STGp, and the p-channel transistor STRp, and the p-channel transistor STBp do not need to be particularly distinguished, the transistors are simply referred to as transistors ST as described above. When the colors do not need to be particularly distinguished, the n-channel transistor STRn, the n-channel transistor STGn, and the n-channel transistor STBn may also be simply referred to as re-channel transistors STn or transistors STn. The p-channel transistor STRp, the p-channel transistor STGp, and the p-channel transistor STBp may also be simply referred to as p-channel transistors STp or transistors STp.

In addition to the selection line SSR, the selection line SSG, and the selection line SSB, the signal line switch circuit ASW shown in FIG. 4 includes a selection line xSSR, a selection line xSSG, and a selection line xSSB to which signals of opposite polarities are input, respectively. Both the selection line SSR and the selection line xSSR may be simply referred to as selection lines SSR, both the selection line SSG and the selection line xSSG may be simply referred to as selection lines SSG, and both the selection line SSB and the selection line xSSB may be simply referred to as selection lines SSB (see FIG. 2). In addition, when the selection line SSR, the selection line SSG, the selection line SSB, the selection line xSSR, the selection line xSSG, and the selection line xSSB do not need to be particularly distinguished, the selection lines may also simply referred to as selection lines SS.

A gate of the n-channel transistor STRn is connected to the selection line SSR. A source of the n-channel transistor STRn is connected to a source of the p-channel transistor STRp and the signal line SLR. A drain of the n-channel transistor STRn is connected to a drain of the p-channel transistor STRp, a drain of the n-channel transistor STGn, a drain of the p-channel transistor STGp, a drain of the n-channel transistor STBn, and a drain of the p-channel transistor STBp, and the lead line WL via the connection electrode CNW.

A gate of the p-channel transistor STRp is connected to the selection line xSSR.

A gate of the n-channel transistor STGn is connected to the selection line SSG. A source of the n-channel transistor STGn is connected to the source of the p-channel transistor STGp and the signal line SLG.

A gate of the p-channel transistor STGp is connected to the selection line xSSG.

A gate of the n-channel transistor STBn is connected to the selection line SSB. A source of the n-channel transistor STBn is connected to the source of the p-channel transistor STBp and the signal line SLB.

A gate of the p-channel transistor STBp is connected to the selection line xSSB.

FIG. 5 is a circuit diagram of the display device DSP related to the detection function as described above. The display device DSP shown in FIG. 4 includes the sensor electrode SRE (common electrode CE) and the common line CML in the sensor area SA. The sensor area SA is equivalent to the display area DA as described above.

As shown in FIG. 5, the display device DSP comprises a plurality of sensor electrodes SRE arrayed in a matrix in the first direction X and the second direction Y in the sensor area SA. The plurality of sensor electrodes SRE function as detection electrodes that come into contact with or are close to an object due to changes in the respective capacitances. An example of the planar shape of the sensor electrode SRE is a square, but the shape may be an octagonal shape in which the corners of the square are slightly cut off, a shape in which the corners of the square are arcuate, or the like. The display device DSP of the present embodiment has the display panel and the touch panel integrated, and can be said to be an in-cell type display device with a touch detection function.

The sensor electrode SRE (common electrode CE) is provided between the insulating layer HRC2 and the insulating layer PAS, and the common line CML is provided between the insulating layer HRC1 and the insulating layer HRC2. The sensor electrode SRE is connected to the common line CML via a contact hole formed in the insulating layer HRC2.

The drive element TC comprises a function of detecting touch by a capacitance manner. More specifically, the drive element TC controls the touch detection operation and processes the signals output from the common line CML. In other words, the common line CML functions as a detection line that outputs the detection signals of the sensor electrode SRE (common electrode CE).

During the touch detection period, drive signals are output from the drive element TC. The switch circuit MUX supplies the drive signals output from the drive element TC to the selected sensor electrode SRE via the common line CML.

The capacitance in the sensor electrode SRE changes when an object comes into contact with and is in close proximity. The voltage values of the drive signals change, based on the change in the capacitance, and the changes in the voltage values are output to the drive element TC as detection signals. Thus, the presence or absence of contact or proximity of the object to the display device DSP, and the position coordinates of the object are detected.

In contrast, during the display period, a constant DC voltage is supplied from the common electrode drive circuit CD to all the common electrodes CE (sensor electrodes SRE) via the line VDCL, the switch circuit MUX, and the common lines CML as described above.

The positional relationship on the plane among the signal lines SL, the signal line switch circuit ASW, the lead lines WL, the common lines CML, and the switch circuit MUX will be described with reference to FIG. 1.

As described above, the signal lines SL are connected to the signal line switch circuit ASW provided in the frame area FA, and the signal line switch circuit ASW is further connected to the terminal TP via the lead lines WL. As shown in FIG. 1, the terminal TP is connected to the drive element DD provided on the flexible wiring board FPC.

In addition, the common lines CML are connected to the switch circuit MUX provided in the frame area FA as described above. As shown in FIG. 5, the switch circuit MUX is connected to the drive element TC and the common electrode drive circuit CD. As shown in FIG. 1, the drive element TC and the common electrode drive circuit CD are provided on the flexible wiring board FPC.

Thus, an area where the signal lines SL, the lead lines WL, and the common lines CML are densely arranged exists in the area near the terminal TP and the flexible wiring board FPC in the frame area FA.

However, if these lines are densely arranged, the frame area FA may be widened and the display area DA may be narrowed. As a result, the performance of the display device DSP may be degraded.

Therefore, these lines need to be efficiently laid out in the frame area FA in order to improve the performance of the display device DSP. For this reason, a large number of lines can be efficiently laid out in the frame area FA by distributing these lines to a plurality of wiring layers stacked via the insulating layer to provide the lines.

However, if a large number of lines are distributed to a plurality of wiring layers and received, the following problems may occur. Details will be described below.

Figure 6:
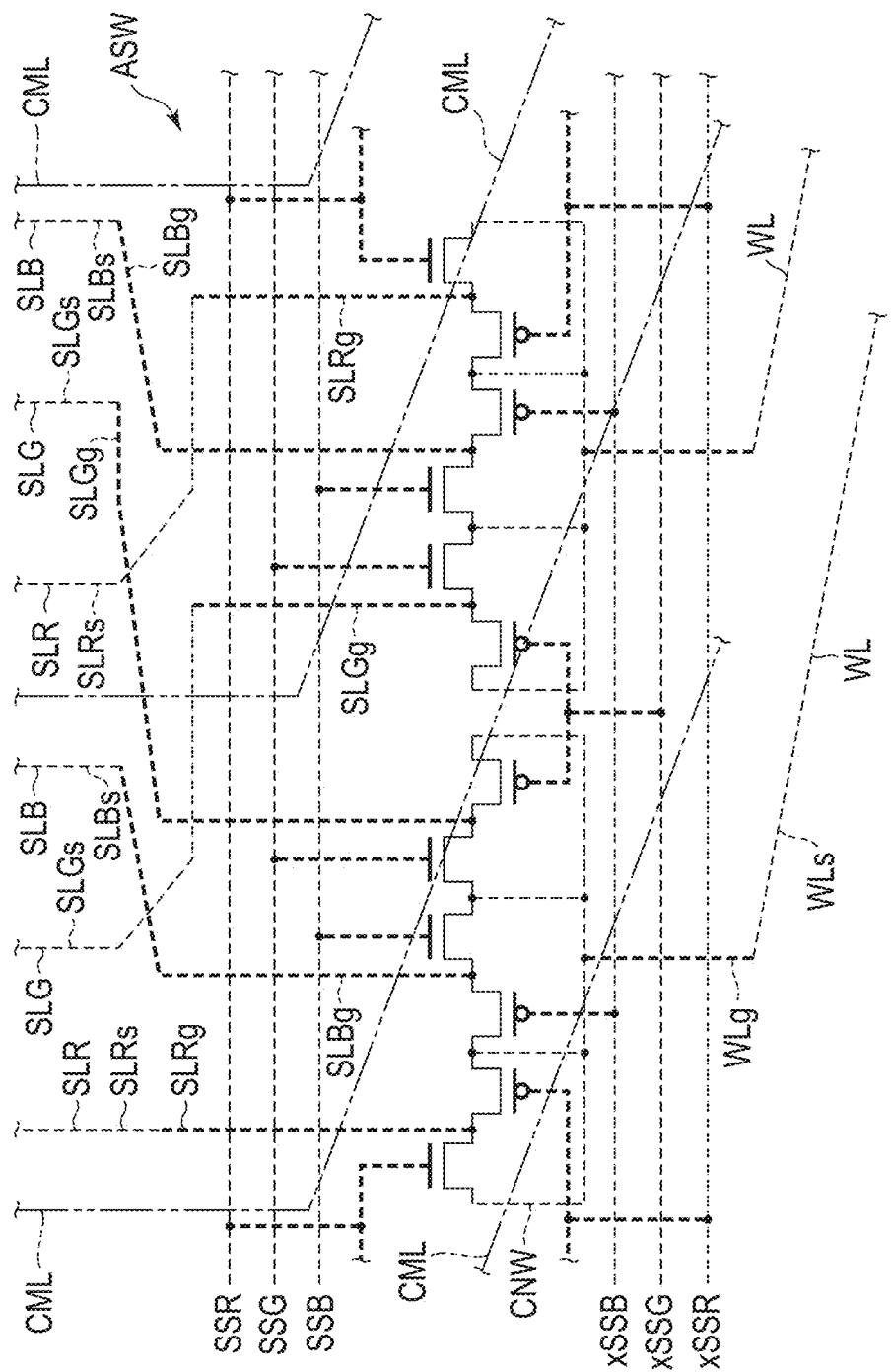
FIG. 6 is a circuit diagram showing the signal line switch circuit and the common line of a comparative example.

FIG. 6 is a circuit diagram showing the signal line switch circuit and the common line of a comparative example. In the example shown in FIG. 6, it is shown that the signal line switch circuit ASW has a circuit configuration equivalent to that shown in FIG. 4 and that the lines are distributed to a plurality of wiring layers. More specifically, in FIG. 6, thick broken lines represent the first wiring layer Wg which is the same wiring layer as the scanning lines GL, and thin broken lines represent the second wiring layer Ws which is the same wiring layer as the signal lines SL. In addition, in FIG. 6, two-dot chain lines represent the third wiring layer Wt which is the same wiring layer as the common lines CML.

As shown in FIG. 3B, the signal line SL is provided on the scanning line GL via the insulating layer ILI in the cross-sectional view. In addition, the insulating layer HRC1 is stacked on the signal line SL, and the common line CML of the same layer (third wiring layer Wt) as the lead electrode TE is provided on the insulating layer HRC1. In other words, although not shown in FIG. 6, the signal line SL (second wiring layer Ws) is provided between the scanning line GL (first wiring layer Wg) and the common line CML (third wiring layer Wt), and the insulating layer is provided at each interval between the lines.

The signal line SLR shown in FIG. 6 includes a first portion SLRs and a second portion SLRg. The signal line SLG includes a first portion SLGs and a second portion SLGg. The signal line SLB includes a first portion SLBs and a second portion SLBg. When the colors are not particularly distinguished, a first portion of the signal line SL is referred to as SLs, and a second portion is referred to as SLg.

The lead line WL includes a first portion WLs and a second portion WLg.

The first portion SLRs of the signal line SLR, the first portion SLGs of the signal line SLG, and the first portion SLBs of the signal line SLB are formed by the second wiring layer Ws. The selection line SSR, the selection line SSG, the selection line SSB, the selection line xSSR, the selection line xSSB, and the selection line xSSG are formed by the second wiring layer Ws.

In contrast, the second portion SLRg of the signal line SLR, the second portion SLGg of the signal line SLG, and the second portion SLBg of the signal line SLB are formed by the first wiring layer Wg.

The first portion WLs of the lead line WL is formed by the second wiring layer Ws. In contrast, the second portion WLg of the lead line WL is formed by the first wiring layer Wg.

As described above, the signal line SL and the first portion WLs of the lead line WL are both formed by the second wiring layer Ws. In addition, the selection line SS provided between the signal line SL and the lead line WL is also formed by the second wiring layer Ws, in plan view. For this reason, the signal line SL and the lead line WL need to be replaced with a different wiring layer in the area where the selection line SS is provided. For this reason, in the example shown in FIG. 6, an interval between the signal line SL and the lead line WL, i.e., the signal line SL and the second portion WLg of the lead line WL are replaced with the first wiring layer Wg.

However, the insulating layer ILI provided between the second wiring layer Ws and the first wiring layer Wg is an inorganic insulating layer having a small film thickness. For this reason, a parasitic capacitance (also referred to as cross capacitance) between the wiring layers may become large. When the parasitic capacitance becomes large, the operation of the transistor constituting the signal line switch circuit ASW may be slowed down or the transistor may not operate.

Therefore, in the present embodiment, the second portion SLg of the signal line SL in FIG. 6 is formed by the third wiring layer Wt. The insulating layer HRC1 is provided between the third wiring layer Wt and the second wiring layer Ws. The insulating layer HRC1 is a thick organic resin layer. When the insulating layer HRC1 having a large film thickness is provided, the parasitic capacitance between the second wiring layer Ws and the third wiring layer Wt becomes small since the second wiring layer Ws and the third wiring layer Wt are separated from each other. The drive operation of the signal line switch circuit ASW becomes faster and the display quality can be improved, by reducing the parasitic capacitance.

In addition, a contact portion of the second wiring layer Ws and the third wiring layer Wt can be arranged directly above the source electrode of the transistor of the signal line switch circuit ASW, by forming the second portion of the signal line SL by the third wiring layer Wt. The size of the frame area FA can be thereby made smaller. The display area DA is further expanded by making the size of the frame area FA smaller. The display quality of the display device DSP can be thereby improved.

FIG. 7 is a circuit diagram showing the signal line switch circuit and the common line of the embodiment. In FIG. 7, similarly to FIG. 6, the thick broken lines represent the first wiring layer Wg which is the same wiring layer as the scanning lines GL, and the thin broken lines represent the second wiring layer Ws which is the same wiring layer as the signal line SL. In FIG. 7, however, the common line Wt, which is the same wiring layer as the common line CML, is represented by a thick solid line to make the drawing easier to see.

In the signal line switch circuit ASW shown in FIG. 7, the signal line SL includes a first portion SLs and a second portion SLt. The first portion SLs of the signal line SL is formed by the second wiring layer Ws, and the second portion SLt is formed by the third wiring layer Wt. More specifically, the signal line SLR includes a first portion SLRs and a second portion SLRt. The signal line SLG includes a first portion SLGs and a second portion SLGt. The signal line SLB includes a first portion SLBs and a second portion SLBt.

In the present embodiment, when the colors are not distinguished, the first portion SLRs, the first portion SLGs, and the first portion SLBs are simply referred to as the first portions SLs. In addition, the second portion SLRt, the second portion SLGt, and the second portion SLBt are simply referred to as the second portions SLt.

In contrast, as regards the lead line WL, the lead line WL first portion WLs is formed by the second wiring layer Ws, and the second portion WLg is formed by the first wiring layer Wg. In other words, the first portion SLs of the signal line SL and the first portion WLs of the lead line WL are both the second wiring layer Ws. In contrast, the second portion SLt of the signal line SL is the third wiring layer Wt, and the second portion WLg of the lead line WL is the first wiring layer Wg, which are formed by using different wiring layers.

The second portion SLt of the signal line SL shown in FIG. 7 is formed by the third wiring layer Wt. Since the thick insulating layer HRC1 is provided between the third wiring layer Wt and the second wiring layer Ws, the second wiring layer Ws and the third wiring layer Wt are separated from each other, and the parasitic capacitance between the second wiring layer Ws and the third wiring layer Wt can be reduced. The drive operation of the signal line switch circuit ASW becomes faster by reducing the parasitic capacitance. The display quality of the display device DSP is thereby improved.

In addition, when the second portion SLt of the signal line SL is formed by the third wiring layer Wt, a contact portion of the second wiring layer Ws and the third wiring layer Wt can be arranged directly above the source electrode SE (or the drain electrode DE) of the transistor ST of the signal line switch circuit ASW. The size of the frame area FA can be thereby made smaller. The display area DA becomes larger by making the size of the frame area FA smaller. The display quality of the display device DSP can be thereby improved.

In addition, as shown in FIG. 7, the second portion SLt of the signal line SL is provided between the adjacent common lines CML. Conversely, the common line CML is provided between the second portions SLt of the adjacent signal lines SL. More specifically, the second portion SLt of one signal line SL is provided between two common lines CML. Furthermore, in other words, one common line CML is provided between the second portions SLt of two signal lines SL.

Thus, the second portion SLt of the signal line SL can be provided without increasing area of the area where the lines are provided, by providing the second portion SLt of the signal line SL between the adjacent common lines CML.

In addition, although the details will be described later, the common line CML and the second portion SLt are desirably arranged substantially in parallel in the area where the common line CML and the second portion SLt of the signal line SL are provided adjacent to each other. Furthermore, in the area, an angle formed by a direction of extension of the common line CML and the second direction Y is desirably smaller than an angle in the other area. Furthermore, in the area, the common line CML desirably extends in a direction substantially parallel to the second direction Y. It is thereby possible to prevent the common line CML and the second portion SLt of the signal line SL from interfering with each other.

Figure 8:
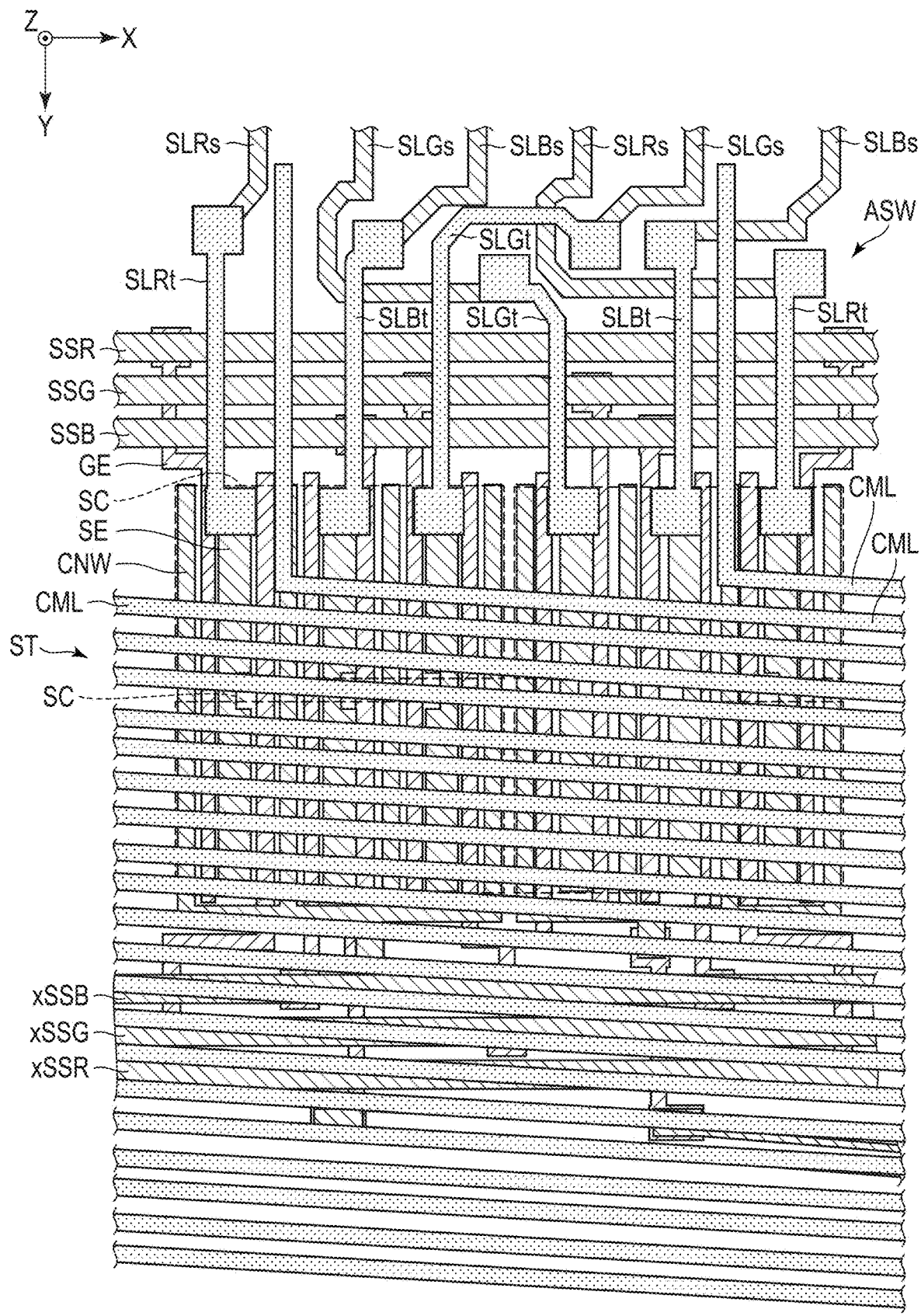
FIG. 8 is a plan view showing the signal line switch circuit of the embodiment.

FIG. 8 is a plan view showing the signal line switch circuit of the embodiment. In the example shown in FIG. 8, a wiring layer with right upward diagonal lines is the first wiring layer Wg, a wiring layer with left upward diagonal lines is the second wiring layer Ws, and a wiring layer with dots is the third wiring layer Wt. In addition, the signal line switch shown in FIG. 8 is divided into layers or constituent elements in FIG. 9 to FIG. 15 to make the switch easier to understand.

Figure 9:
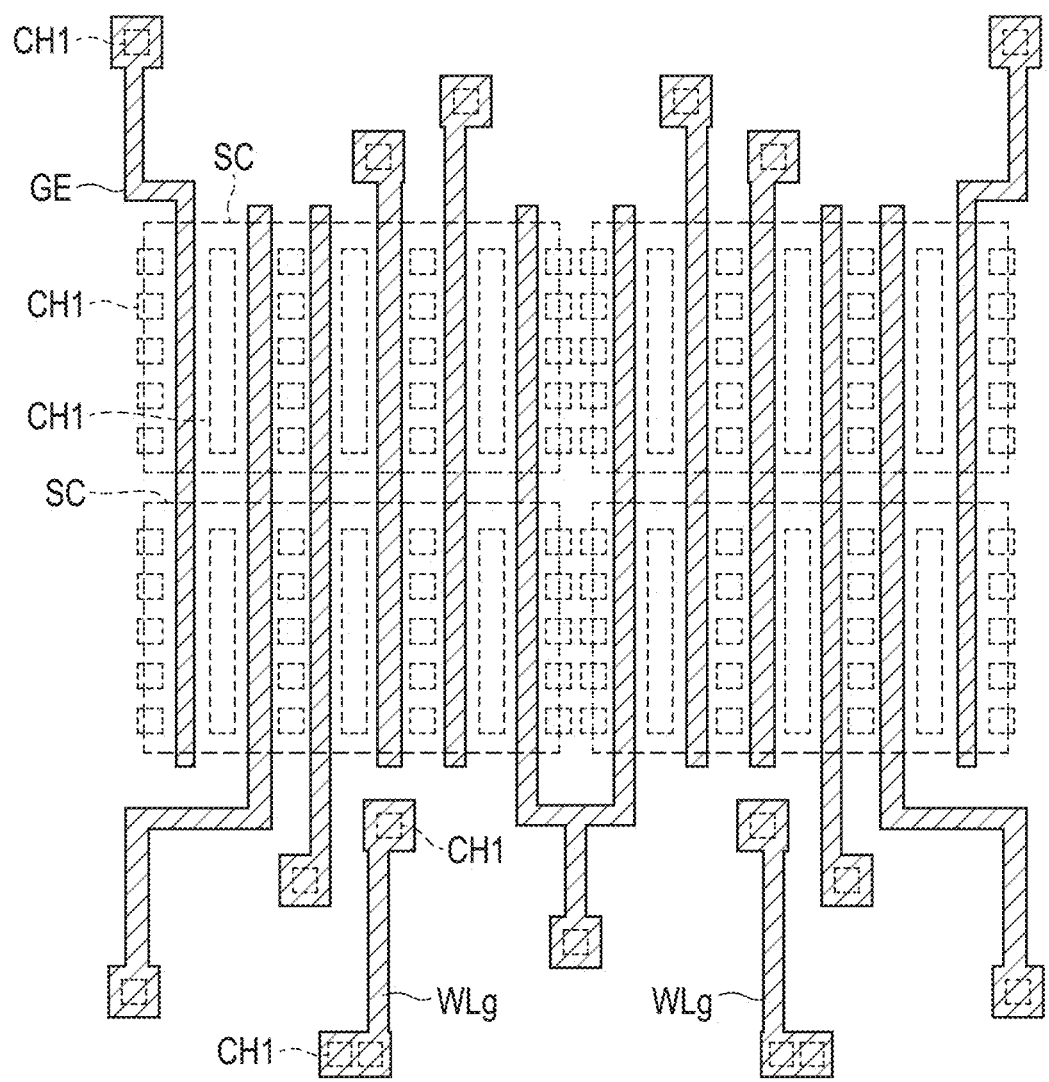
FIG. 9 is a plan view showing a constituent element formed by a semiconductor layer and a first wiring layer of FIG. 8.
Figure 10:
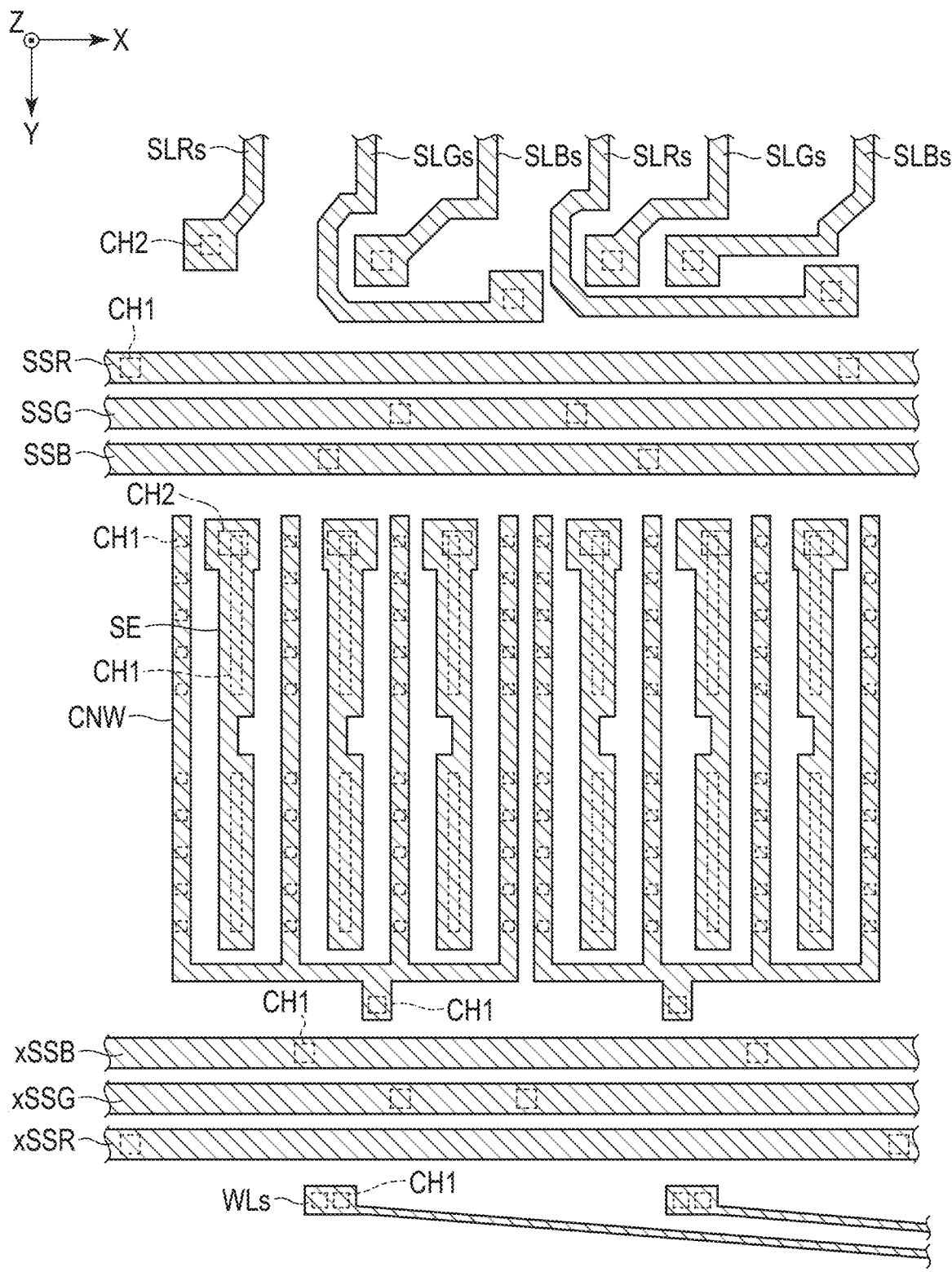
FIG. 10 is a plan view showing a constituent element formed by a second wiring layer of FIG. 8.
Figure 11:
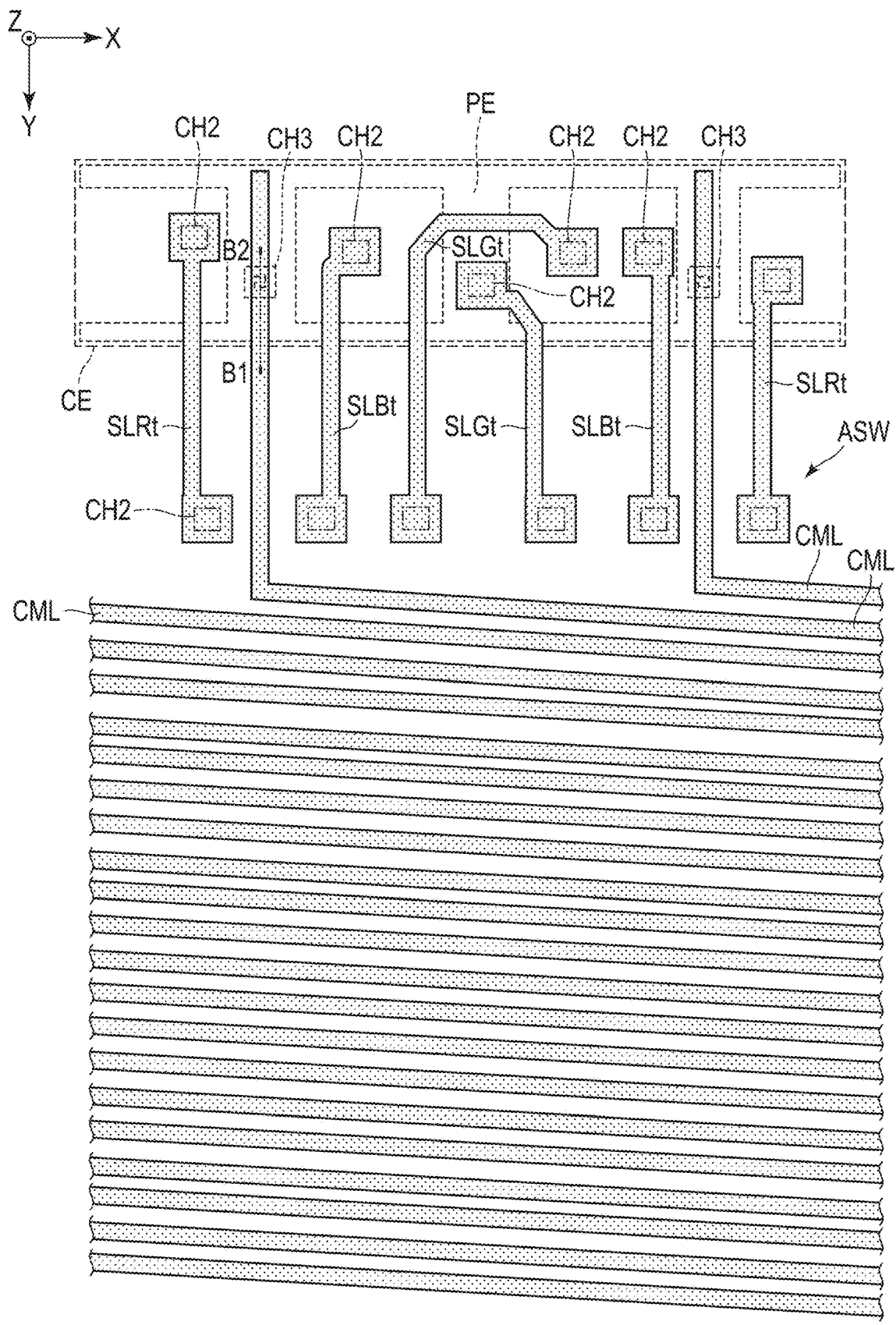
FIG. 11 is a plan view showing a constituent element formed by a third wiring layer of FIG. 8.
Figure 12:
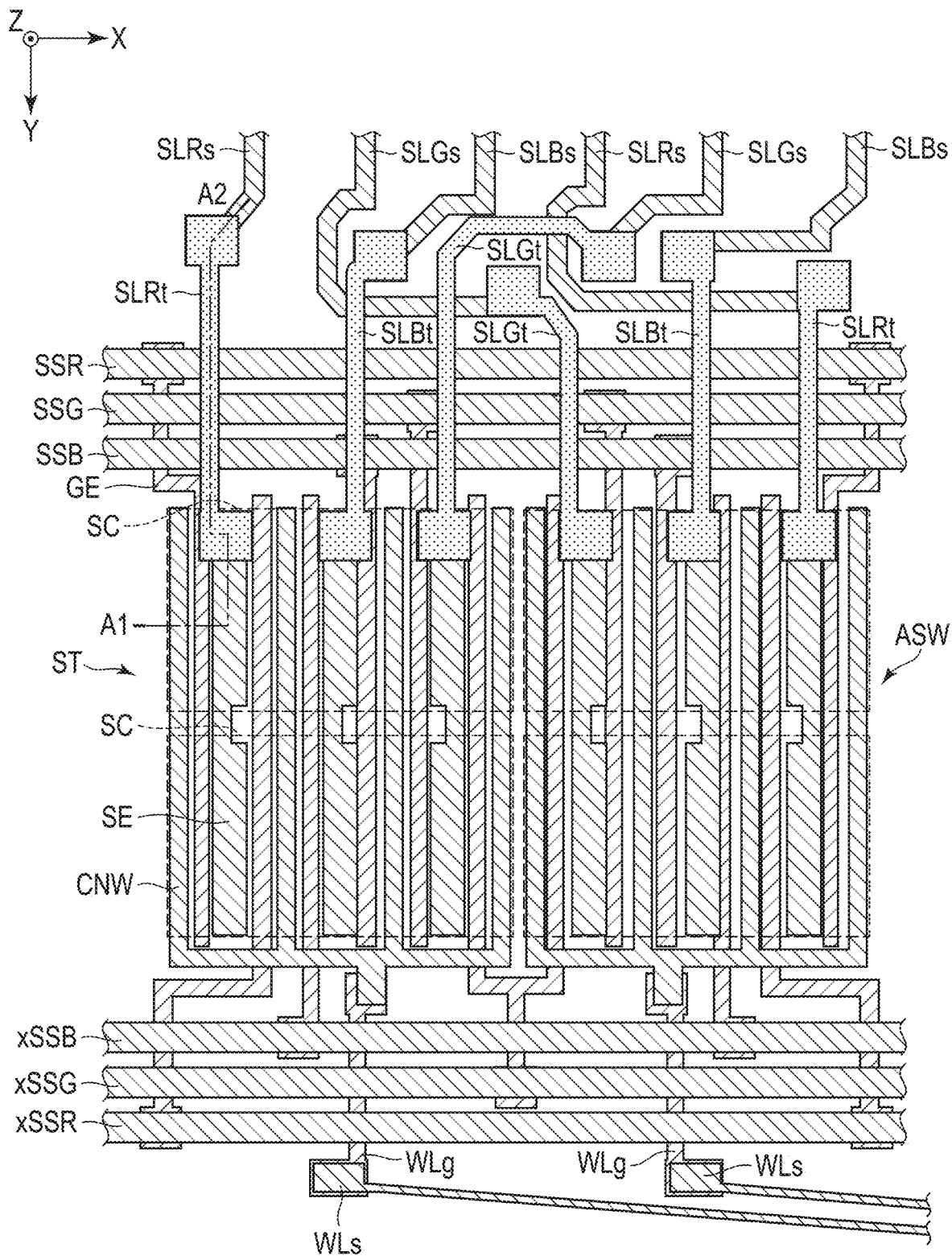
FIG. 12 is a plan view showing a transistor including a gate electrode and a source electrode, a signal line, and a connection electrode of FIG. 8.
Figure 13:
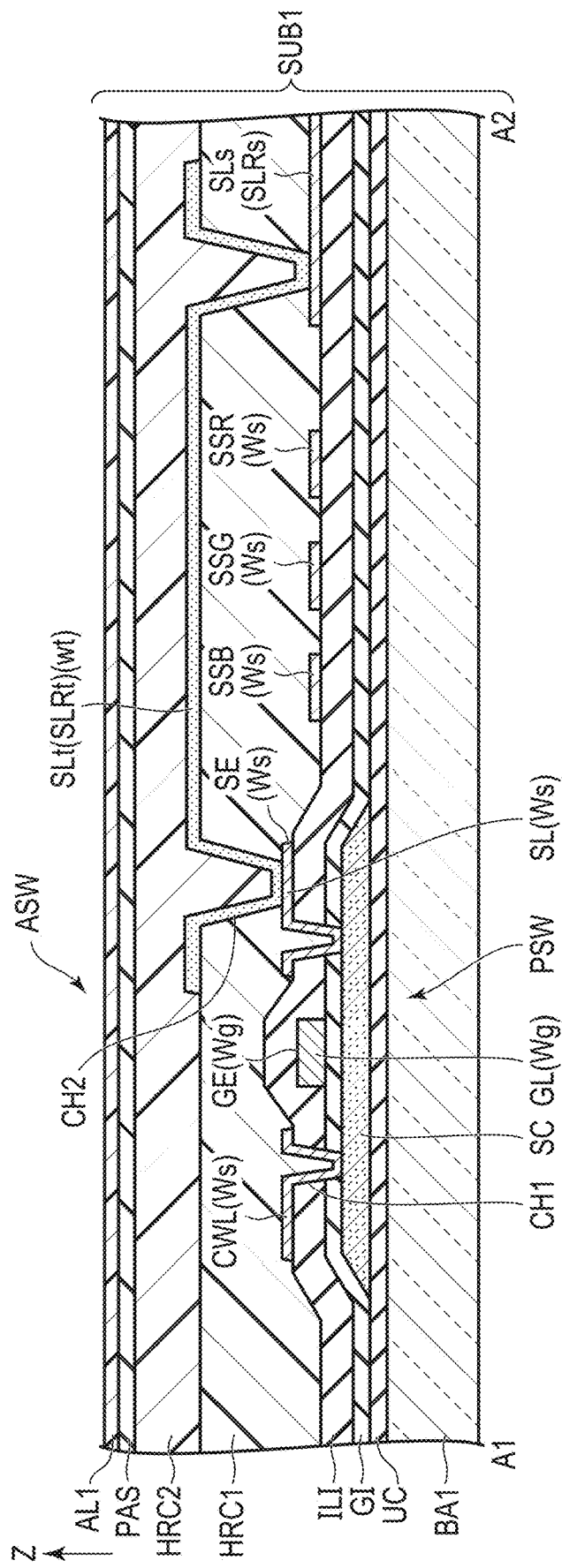
FIG. 13 is a cross-sectional view taken along line A1-A2 in FIG. 12.
Figure 14:
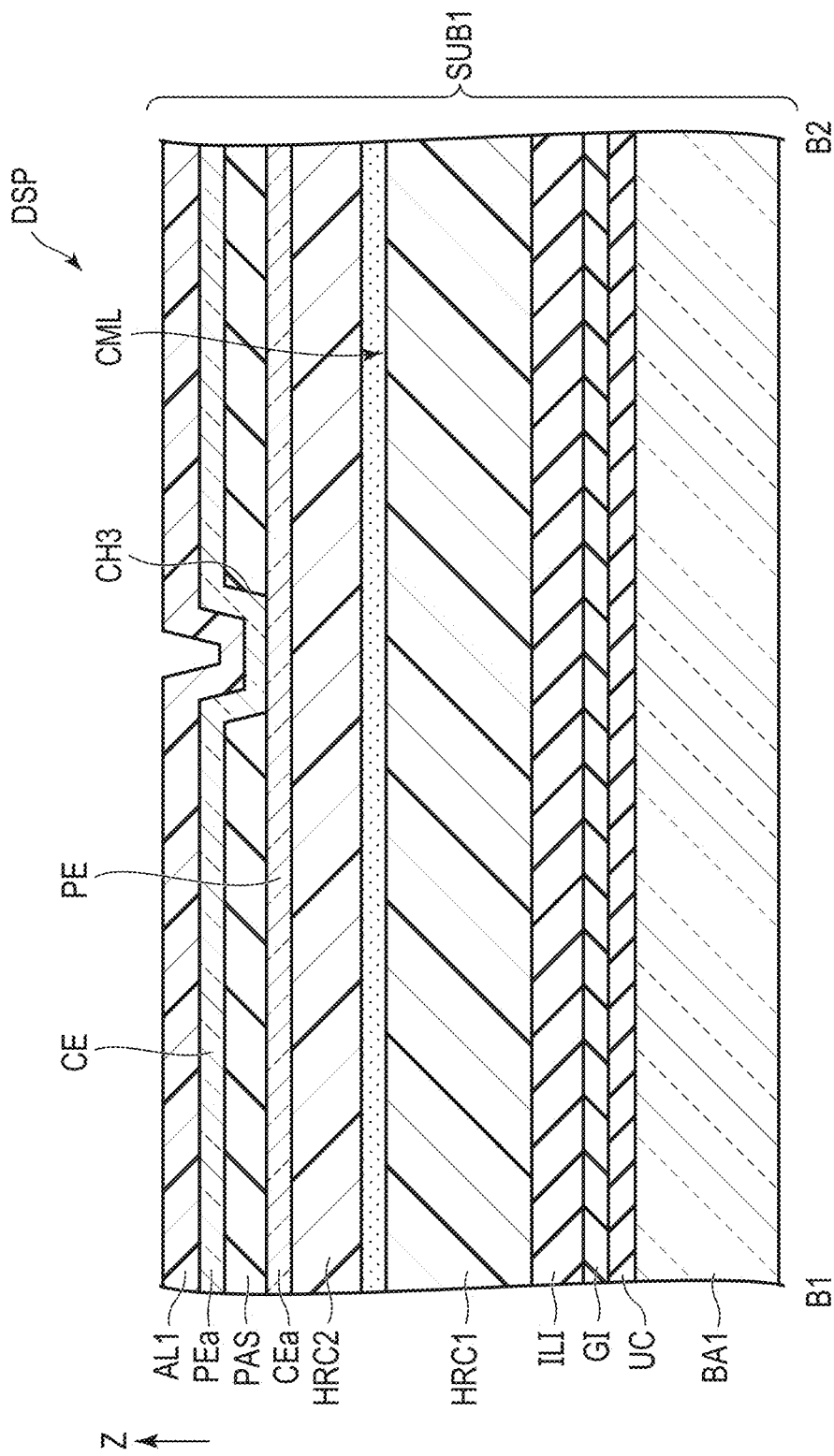
FIG. 14 is a cross-sectional view showing the display device along line B1-B2 in FIG. 11.
Figure 15:
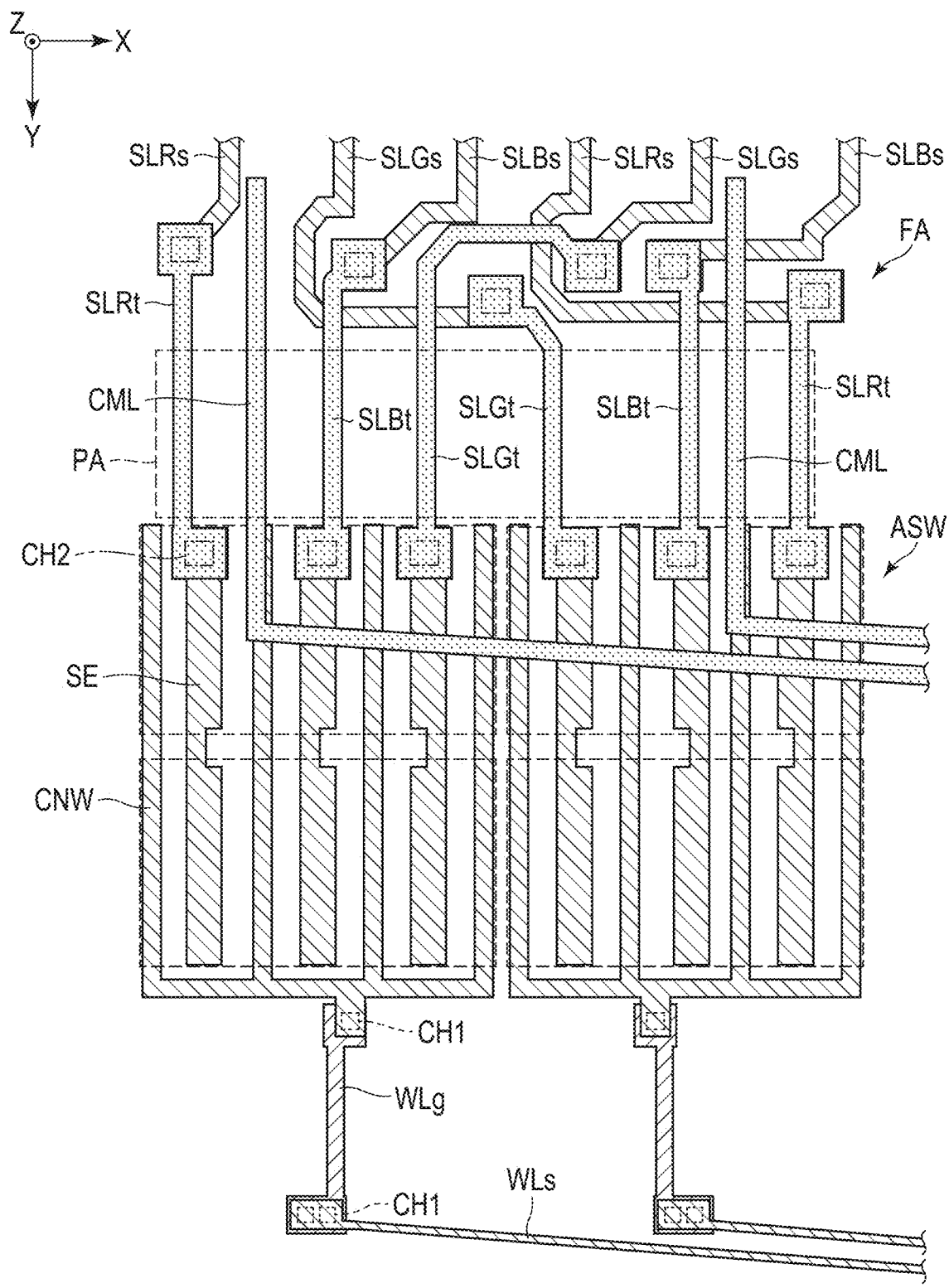
FIG. 15 is a plan view showing a signal line, a common line, and a lead line.

FIG. 9 is a plan view showing the constituent elements formed by the semiconductor layer SC and the first wiring layer Wg in FIG. 8. FIG. 10 is a plan view showing the constituent elements formed by the second wiring layer Ws in FIG. 8. FIG. 11 is a plan view showing the constituent elements formed by the third wiring layer Wt in FIG. 8. FIG. 12 is a plan view showing the transistor ST including the gate electrode GE and the source electrode SE, the signal lines SL (first portions SLs and second portions SLt), and the connection electrode CNW in FIG. 8. FIG. 13 is a cross-sectional view taken along line A1-A2 in FIG. 12. FIG. 14 is a cross-sectional view taken along B1-B2 in FIG. 11. FIG. 15 is a plan view showing the signal lines SL (first portions SLs and second portions SLt), the common line CML, and the lead lines WL (lead line WLt and lead line WLg).

In FIG. 8 to FIG. 15, for example, several constituent elements such as contact holes may be omitted in order to make the drawings easier to see.

As shown in FIG. 13, the signal line switch circuit ASW includes the insulating layer UC, the transistor ST (transistor STR), the insulating layer HRC1, the second portion SLt of the signal line SL, the insulating layer HRC2, and the insulating layer PAS on the base BA1. The transistor ST (transistor STR) includes the semiconductor layer SC, the insulating layer GI, the gate electrode GE, the insulating layer ILI, the lead line CNW (also referred to as the drain electrode DE), and the source electrode SE. In FIG. 13, illustration of the polarizer PL1 is omitted.

A contact hole CH1 shown in FIG. 9, FIG. 10, FIG. 13, and FIG. 15 is a contact hole formed in the insulating layer ILI.

The connection electrode CNW is connected to the semiconductor layer SC through a contact hole CH1. The connection electrode CNW is connected to the second portion WLg of the lead line WL through the contact hole CH1.

The source electrode SE is connected to the semiconductor layer SC through the contact hole CH1.

The selection lines SS (selection line SSR, selection line SSG, and selection line SSB) are connected to the gate electrodes GE through the contact holes CH1.

The first portions WLs of the lead lines WL are connected to the second portions WLg through the contact holes CH1.

A contact hole CH2 shown in FIG. 11, FIG. 13, and FIG. 15 is a contact hole formed in the insulating layer HRC1.

The second portions SLt (second portion SLRt, second portion SLGt, and second portion SLBt) of the signal lines SL are connected to the first portions SLs (first portion SLRs, first portion SLGs, and first portion SLBs) of the signal lines SL through the contact holes CH2. The second portions SLt of the signal lines SL are connected to the source electrodes SE through the contact holes CH2.

FIG. 11 shows the common electrode CE that was not shown in FIG. 9. In addition, FIG. 14 is a cross-sectional view showing the display device along line B1-B2 in FIG. 11. As shown in FIG. 11 and FIG. 14, a shield electrode is provided at a position where the first portion SLs and the second portion SLt of the signal line SL are connected through the contact hole CH2. The shield electrode is composed of a first shield electrode CEa which is in the same layer as the common electrode CE and a second shield electrode PEa which is in the same layer as the pixel electrode PE, and the first shield electrode CEa and the second shield electrode PEa are connected to each other through the contact hole CH3 provided in the insulating layer PAS. In addition, the first shield electrode CEa and the second shield electrode PEa do not overlap with the signal line switch circuit ASW in plan view. Furthermore, the first shield electrode CEa is an electrode that is not connected to the sensor electrode SRE (common electrode CE) in the display area DA and, similarly, the second shield electrode PEa is an electrode that is not connected to the pixel electrode PE in the display area DA. Although not shown, a common potential or a low potential is applied to the shield electrodes.

In addition, although not shown in FIG. 11, the alignment film AL1 covers the signal line switch circuit ASW. Edge portions of the alignment film AL are located between the signal line drive circuit SLC and the signal line switch circuit ASW in plan view. In addition, as shown in FIG. 11, the edge portion closer to the terminal TP, of the edge portions of the common electrode CE in plan view, is located between the signal line switch circuit ASW and the display area DA. In other words, it can be said that the edge portion of the common electrode CE is located between the edge portion of the alignment film AL1 and the display area DA.

In the signal line switch circuit ASW of the present embodiment, as shown in, for example, FIG. 13, since the insulating layer HRC1 is provided between the first portion SLs of the signal line SL and the source electrode SE (second wiring layer Ws), and the second portion SLt (third wiring layer Wt) of the signal line SL, the parasitic capacitance between them can be reduced. The drive operation of the signal line switch circuit ASW becomes faster by reducing the parasitic capacitance. Therefore, the display quality of the display device DSP can be improved.

In addition, in the present embodiment, for example, in FIG. 15, an area where the second portion SLt of the signal line SL is provided between the adjacent common lines CML, in the frame area FA, i.e., an area where the common line CML and the second portion SLt are provided adjacent to each other, is referred to as an area PA. In other words, the area PA is an area between the display area DA and the signal line switch circuit ASW. In the area PA, the common line CML and the second portion SLt are desirably arranged substantially parallel to each other. Furthermore, the common line CML and the second portion SLt are desirably extended in a direction substantially parallel to the second direction Y. Based on the above, it is possible to prevent the common line CML and the second portion SLt of the signal line SL from interfering with each other. Furthermore, the length of the area PA along the first direction X can be shortened, and the frame area FA can be narrowed. The display area DA can be arranged to be wider by narrowing the frame area FA. The display quality of the display device DSP can be thereby improved.

Figure 16:
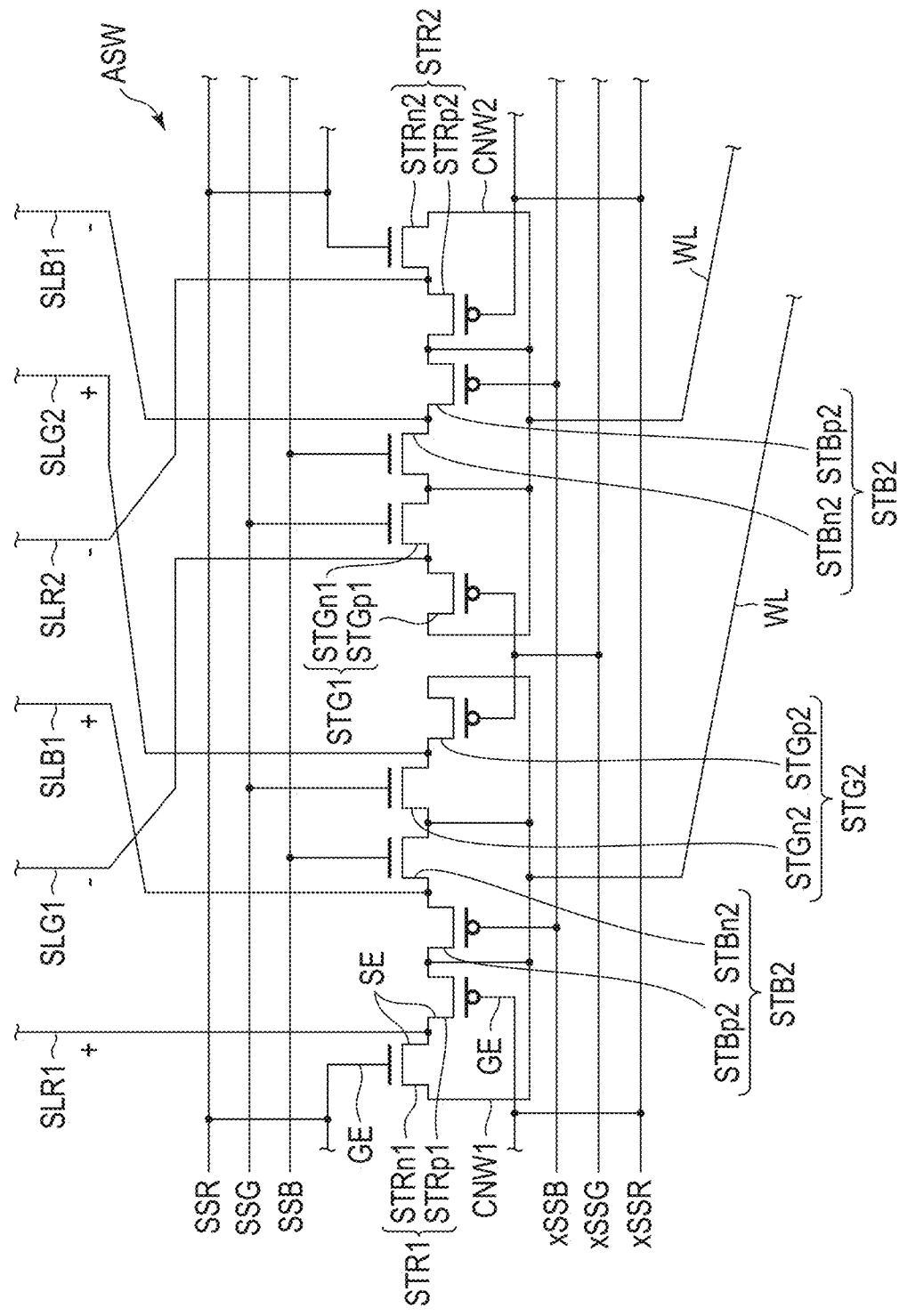
FIG. 16 is a circuit diagram showing the signal line switch circuit.
Figure 17:
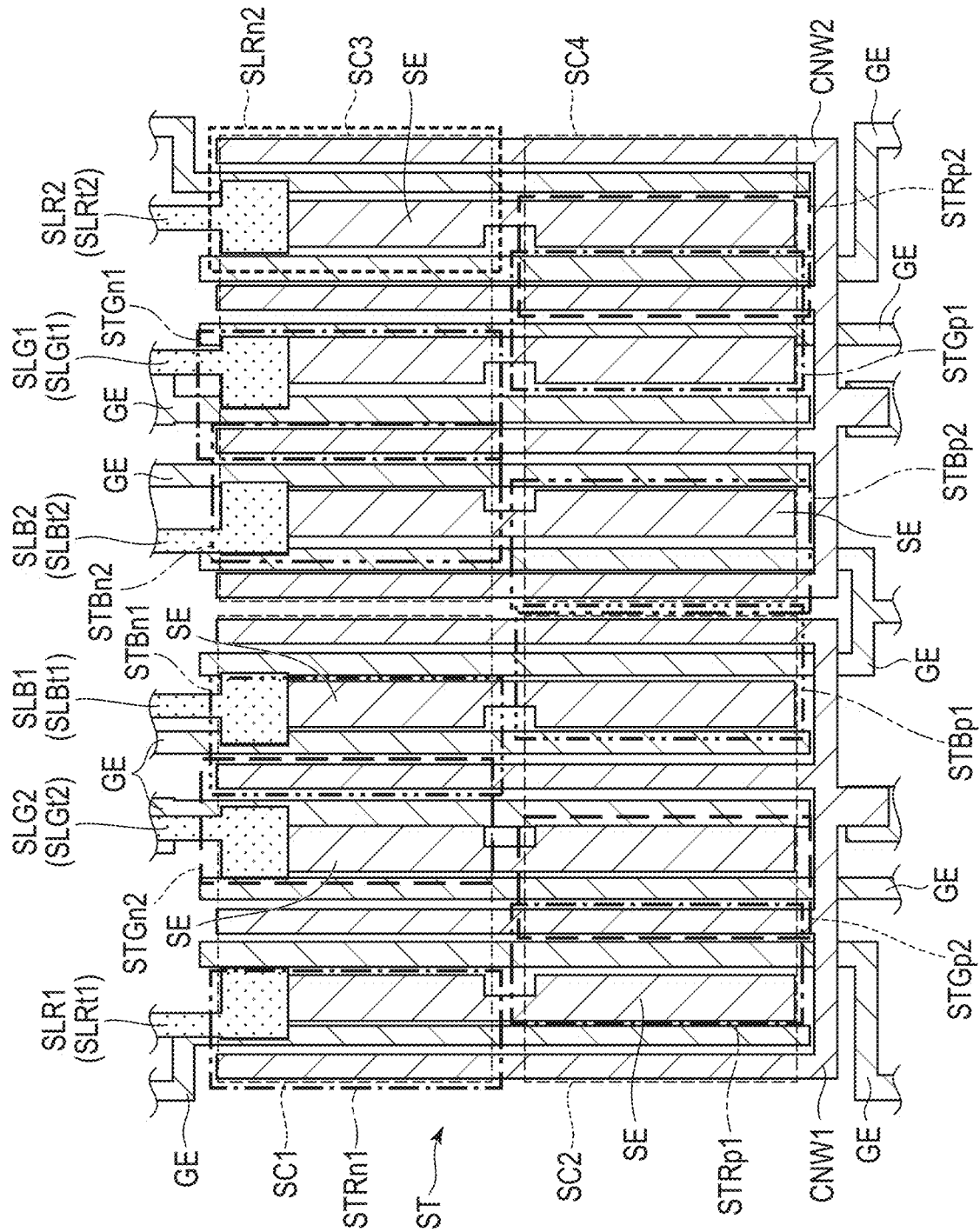
FIG. 17 is an enlarged view showing a part of FIG. 12.

Column inversion drive of the display device DSP will be described with reference to FIG. 16 and FIG. 17. FIG. 16 is a circuit diagram showing the signal line switch circuit. FIG. 16 is a diagram similar to FIG. 5, but is a more detailed diagram of FIG. 5. FIG. 17 is an enlarged view of a part of FIG. 13.

As described above, each of the plurality of pixels PX includes the sub-pixel SXR, the sub-pixel SXG, and the sub-pixel SXB that display the respective colors of R (red), G (green), and B (blue). When two pixels adjacent to each other in the first direction X are referred to as a pixel PX1 and a pixel PX2, the pixel PX1 is assumed to include the sub-pixel SXR1, the sub-pixel SXG1, and the sub-pixel SXB1, and the pixel PX2 is assumed to include the sub-pixel SXR2, the sub-pixel SXG2, and the sub-pixel SXB2. The sub-pixel SXR1, the sub-pixel SXG1, and the sub-pixel SXB1 are connected to the signal line SLR1, the signal line SLG1, and the signal line SLB1, respectively. The sub-pixel SXR2, the sub-pixel SXG2, and the sub-pixel SXB2 are connected to the signal line SLR2, the signal line SLG2, and the signal line SLB2, respectively. As shown in FIG. 16, the signal line SLR1, the signal line SLG1, the signal line SLB1, the signal line SLR2, the signal line SLG2, and the signal line SLB2 are arranged in this order along the first direction X.

In FIG. 16 and FIG. 17, however, the order of arrangement of the sub-pixels SX along the first direction X (in other words, the order of arrangement of the signal lines SL) and the order of arrangement along the direction X of the transistors ST included in the signal line switch circuit ASW do not correspond to each other and are replaced. More specifically, the order of the transistor STG1 and the transistor STG2 is replaced.

As shown in FIG. 16 and FIG. 17, the transistor STRn1 includes a semiconductor layer SC1, a gate electrode GE connected to the selection line SSR, a source electrode SE connected to the signal line SLR1, and a connection electrode CNW1.

The transistor STGn2 includes the semiconductor layer SC1, a gate electrode GE connected to the selection line SSG, a source electrode SE connected to the signal line SLG2, and the connection electrode CNW1.

The transistor STBn1 includes the semiconductor layer SC1, a gate electrode GE connected to the selection line SSB, a source electrode SE connected to the signal line SLB1, and the connection electrode CNW1.

The transistor STRp1 includes a semiconductor layer SC2, a gate electrode GE connected to the selection line xSSR, a source electrode SE connected to the signal line SLR1, and the connection electrode CNW1.

The transistor STGp2 includes a semiconductor layer SC2, a gate electrode GE connected to the selection line xSSG, a source electrode SE connected to the signal line SLG2, and the connection electrode CNW1.

The transistor STBp1 includes the semiconductor layer SC2, a gate electrode GE connected to the selection line xSSB, a source electrode SE connected to the signal line SLB1, and the connection electrode CNW1.

The transistor STRn2 includes a semiconductor layer SC3, a gate electrode GE connected to the selection line SSR, a source electrode SE connected to the signal line SLR2, and a connection electrode CNW2.

The transistor STGn1 includes the semiconductor layer SC3, a gate electrode GE connected to the selection line SSG, a source electrode SE connected to the signal line SLG1, and the connection electrode CNW2.

The transistor STBn2 includes the semiconductor layer SC3, a gate electrode GE connected to the selection line SSB, a source electrode SE connected to the signal line SLB2, and the connection electrode CNW2.

The transistor STRp2 includes a semiconductor layer SC4, a gate electrode GE connected to the selection line xSSR, a source electrode SE connected to the signal line SLR2, and the connection electrode CNW2.

The transistor STGp1 includes the semiconductor layer SC4, a gate electrode GE connected to the selection line xSSG, a source electrode SE connected to the signal line SLG1, and the connection electrode CNW2.

The transistor STBp2 includes the semiconductor layer SC4, a gate electrode GE connected to the selection line xSSB, a source electrode SE connected to the signal line SLB2, and the connection electrode CNW2.

The transistor STRn1 and the transistor STRp1 are referred to as transistors STR1. The transistor STGn2 and the transistor STGp2 are referred to as transistors STG2. The transistor STBn1 and the transistor STGp1 are referred to as transistors STB1. In addition, the transistor STRn2 and the transistor STRp2 are referred to as transistors STR2. The transistor STGn1 and the transistor STGp1 are referred to as transistors STG1. The transistor STBn2 and the transistor STGp2 are referred to as transistors STB2.

In FIG. 17, however, only a second portion SLRt1 formed by the third wiring layer Wt among the signal lines SLR1 is shown in order to make the drawing easier to understand. Similarly, in FIG. 17, a second portion SLGt1 of the signal line SLG1, a second portion SLBt1 of the signal line SLB1, a second portion SLRt2 of the signal line SLR2, a second part SLGt2 of the signal line SLG2, and a second portion SLBt2 of the signal line SLB2 are shown.

The sub-pixel SXR1 and the sub-pixel SXB1 included in the pixel PX1, and the sub-pixel SXG2 included in the pixel PX2 are connected to the signal line SLR1, the signal line SLG2, and the signal line SLB1 as described above. In addition, the sub-pixel SXG1 included in the pixel PX1, and the sub-pixel SXR2 and the sub-pixel SXB included in the pixel PX2 are connected to the signal line SLR2, the signal line SLG1, and the signal line SLB2 as described above.

As shown in FIG. 16, signals having the same polarity as each other, for example, signals having the positive polarity, are input to the signal line SLR1, the signal line SLG2, and the signal line SLB1. In contrast, signals having the same polarity as each other and having the polarity opposite to the signals input to the signal line SLR1, the signal line SLG2, and the signal line SLB1, for example, signals having a negative polarity, are input to the signal line SLR2, the signal line SLG1, and the signal line SLB2. In other words, the signals having opposite polarities are input to the adjacent signal lines, in the signal line SLR1, the signal line SLG1, the signal line SLB1, the signal line SLR2, the signal line SLG2, and the signal line SLB2. In other words, the display device DSP including the signal line switch circuit ASW shown in FIG. 16 is driven by column inversion drive by which signals of opposite polarities are input for each sub-pixel column.

The transistor STR1, the transistor STG2, and the transistor STB1 connected to the signal line SLR1, the signal line SLG2, and the signal line SLB1 are commonly connected to the connection electrode CNW1. The transistor STR2, the transistor STG1, and the transistor STB2 connected to the signal line SLR2, the signal line SLG1, and the signal line SLB2 are commonly connected to the connection electrode CNW2. In other words, the signal lines SL to which the signals having the same polarity are input are connected to the transistors ST connected to the same connection electrode CNW. Therefore, for example, by inputting the signals having the positive polarity to the connection electrode CNW1, the signals having the positive polarity are input to the signal line SLR1, the signal line SLG2, and the signal line SLB1. In addition, by inputting the signals having the positive polarity to the connection electrode CNW2, the signals having the negative polarity are input to the signal line SLR2, the signal line SLG1, and the signal line SLB2.

In other words, in the display device DSP of the present embodiment, when the column inversion drive is executed, it is possible not to individually input the signals having the positive polarity and the negative polarity to the respective signal lines, but to input the signals having the same polarity via the connection electrodes CNW at once. The power consumption of the display device DSP can be thereby reduced.

In the signal line switch circuit ASW shown in FIG. 16 and FIG. 17, the transistor STG1 and the transistor STG2 corresponding to green (G) are replaced, but the present invention is not limited to this. The transistor ST corresponding to red (R) or blue (B) may be replaced.

As described above, in the signal line switch circuit ASW of the display device DSP of the present embodiment, the parasitic capacitance between the lines can be reduced. In addition, in the signal line switch circuit ASW of the present embodiment, the common line CML formed by the third wiring layer Wt of the same layer and the second portion SLt of the signal line SL are arranged substantially in parallel. The interference between the common line CML and the signal line SL (second part SLt) can be thereby prevented. As a result, the display quality of the display device DSP of the present embodiment can be improved.

Configuration Example 1

Figure 18:
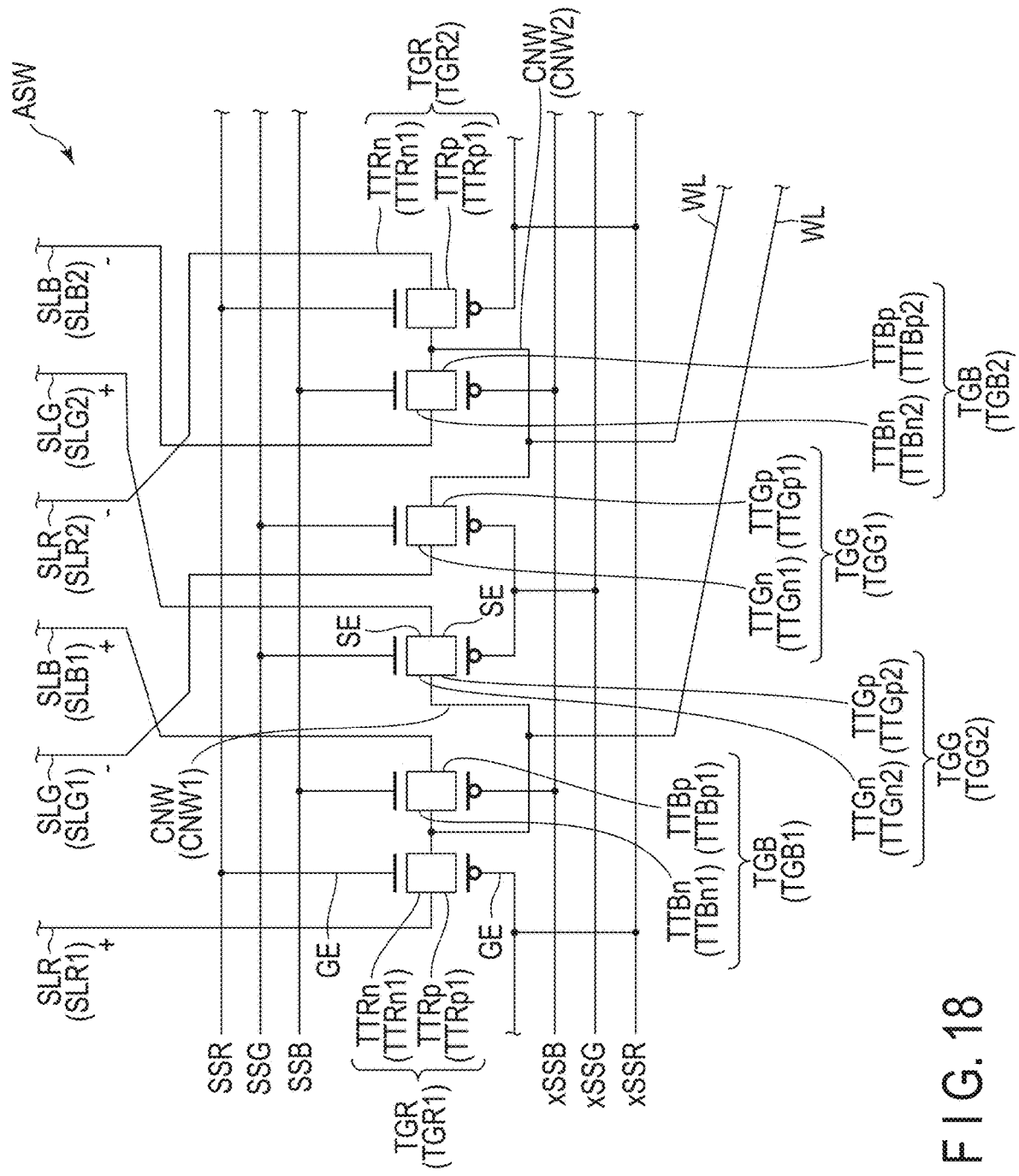
FIG. 18 is a circuit diagram showing another configuration example of the display device according to the embodiment.

FIG. 18 is a circuit diagram showing another configuration example of the display device according to the embodiment. The configuration example shown in FIG. 18 is different from the configuration example shown in FIG. 4 in that the transistors of the signal line switch circuit ASW are provided at two stages.

The signal line switch circuit ASW shown in FIG. 18 includes a transmission gate TGR as the transistor STR, a transmission gate TGG as the transistor STG, and a transmission gate TGB as the transistor STB. When the transmission gate TGR, the transmission gate TGG, and the transmission gate TGB do not need to be particularly distinguished, the transmission gates are referred to as transmission gates TG. In the transmission gates TG, n-channel transistors TTn and p-channel transistors TTp have the sources connected to each other and have the drains connected to each other.

The transmission gate TGR includes an re-channel transistor TTRn and a p-channel transistor TTRp. The transmission gate TGG includes an n-channel transistor TTGn and a p-channel transistor TTGp. The transmission gate TGB includes an n-channel transistor TTBn and a p-channel transistor TTBp.

When the n-channel transistor TTRn, the n-channel transistor TTGn, the n-channel transistor TTBn, the p-channel transistor TTRp, the p-channel transistor TTGp, and the p-channel transistor TTBp do not need to be particularly distinguished, the transistors are simply referred to as transistors TT. In addition, as described above, when the colors do not need to be particularly distinguished, the n-channel transistor TTRn, the n-channel transistor TTGn, and the n-channel transistor TTBn are simply referred to as n-channel transistors TTn or transistors TTn. Similarly, the p-channel transistor TTRp, the p-channel transistor TTGp, and the p-channel transistor TTBp are simply referred to as p-channel transistors TTp or transistors TTp.

A gate of the n-channel transistor TTRn is connected to the selection line SSR. A source of the n-channel transistor TTRn is connected to a source of the p-channel transistor TTRp and the signal line SLR. A drain of the n-channel transistor TTRn is connected to a drain of the p-channel transistor TTRp, a drain of the n-channel transistor TTGn, a drain of the p-channel transistor TTGp, a drain of the n-channel transistor TTBn, and a drain of the p-channel transistor TTBp, and the connection electrode CNW. The connection electrode CNW is connected to the lead line WL.

A gate of the p-channel transistor TTRp is connected to the selection line xSSR.

A gate of the n-channel transistor TTGn is connected to the selection line SSG. A source of the n-channel transistor TTGn is connected to the source of the p-channel transistor TTGp and the signal line SLG.

A gate of the p-channel transistor TTGp is connected to the selection line xSSG.

A gate of the n-channel transistor TTBn is connected to the selection line SSB. A source of the n-channel transistor TTBn is connected to the source of the p-channel transistor TTBp and the signal line SLB.

A gate of the p-channel transistor TTBp is connected to the selection line xSSB.

Figure 19:
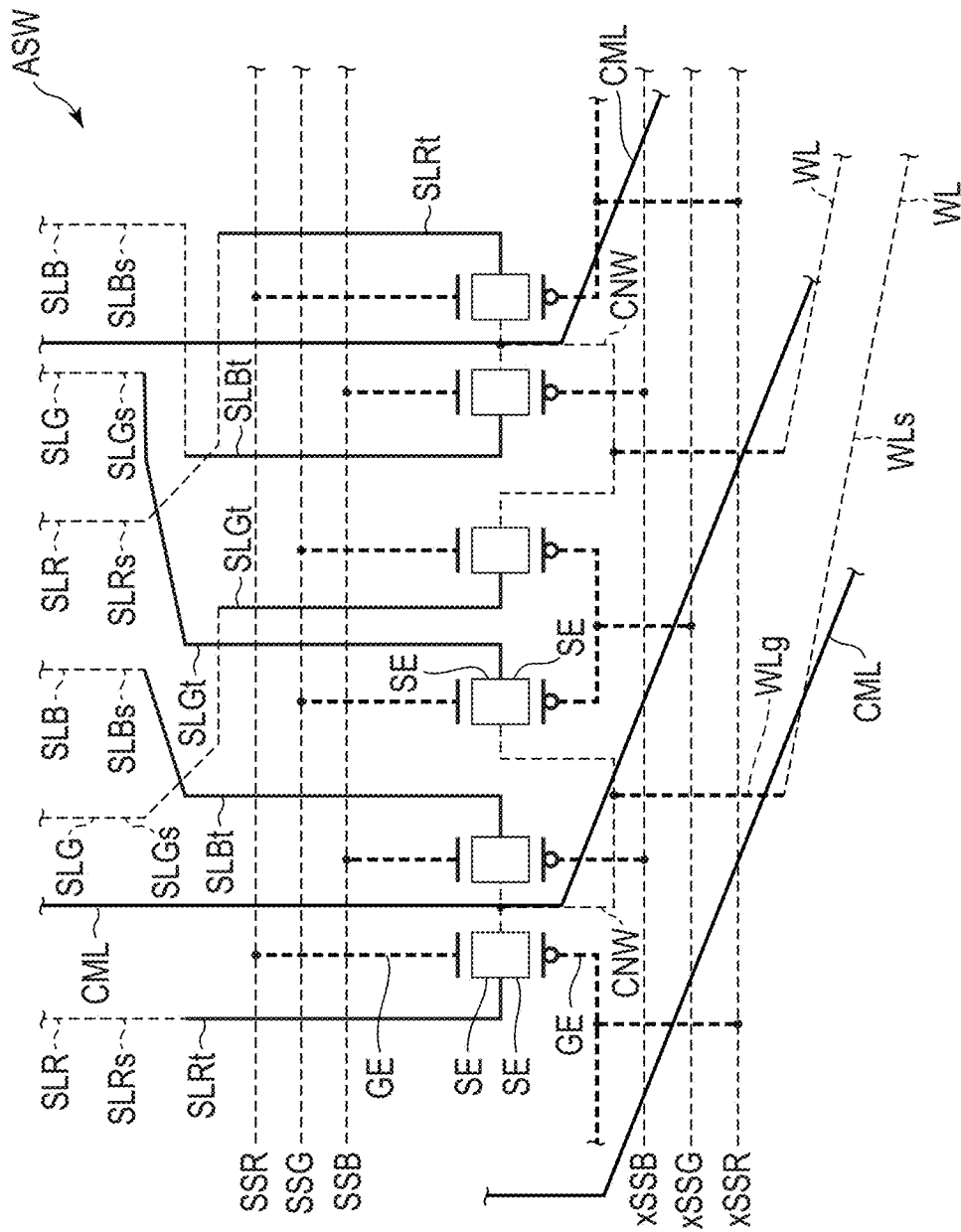
FIG. 19 is a circuit diagram showing a signal line switch circuit and a common line of another comparative example.

FIG. 19 is a circuit diagram showing the signal line switch circuit and the common line of the configuration example. In FIG. 19, the signal line switch circuit shown in FIG. 16 and the common line are shown separately for each layer. More specifically, in FIG. 19, thick broken lines represent the first wiring layer Wg which is the same wiring layer as the scanning lines GL, thin broken lines represent the second wiring layer Ws which is the same wiring layer as the signal lines SL, and thick solid lines represent the third wiring layer Wt which is the same wiring layer as the common lines CML.

In FIG. 19, too, the green (G) transmission gate TGG is replaced similarly to FIG. 17, but the details will be described later.

In the signal line switch circuit ASW shown in FIG. 19, the signal lines SL (signal line SLR, signal line SLG, and signal line SLB) include first portions SLs (first portion SLRs, first portion SLGs, and first portion SLBs) and second portions SLt (second portion SLRt, second portion SLGt, and second portion SLBt), similarly to FIG. 7. The first portion SLs of the signal line SL is formed by the second wiring layer Ws, and the second portion SLt is formed by the third wiring layer Wt.

In contrast, as regards the lead line WL, the first portion WLs of the lead line WL is formed by the second wiring layer Ws, and the second portion WLg is formed by the first wiring layer Wg. In other words, the first portion SLs of the signal line SL and the first portion WLs of the lead line WL are both formed by the second wiring layer Ws. In contrast, the second portion SLt of the signal line SL is the third wiring layer Wt, and the second portion WLg of the lead line WL is the first wiring layer Wg, which are formed by using different wiring layers.

The second portion SLt of the signal line SL shown in FIG. 19 is formed by the third wiring layer Wt. The thick insulating layer HRC1 is provided between the third wiring layer Wt and the second wiring layer Ws. Therefore, the second wiring layer Ws and the third wiring layer Wt are separated from each other, and the parasitic capacitance between the second wiring layer Ws and the third wiring layer Wt can be reduced. The drive operation of the signal line switch circuit ASW becomes faster by reducing the parasitic capacitance. The display quality of the display device DSP is thereby improved.

In addition, by forming the second portion SLt of the signal line SL by the third wiring layer Wt, a contact portion of the second wiring layer Ws and the third wiring layer Wt can be arranged directly above the source electrode SE (or the drain electrode DE) of the transistor of the signal line switch circuit ASW. The size of the frame area FA can be thereby made smaller. A wider display area DA can be obtained by making the size of the frame area FA smaller. The display quality of the display device DSP can be thereby improved.

In addition, the second portion SLt of the signal line SL shown in FIG. 19 is provided between the adjacent common lines CML, similarly to FIG. 7. Thus, the second portion SLt of the signal line SL can be provided without increasing area of the area where the lines are provided, by providing the second portion SLt of the signal line SL between the adjacent common lines CML.

In addition, the common line CML and the second portion SLt are desirably arranged substantially in parallel in the area where the second portion SLt of the signal line SL is provided between the signal line and the common line CML, similarly to FIG. 7. Furthermore, in the area, an angle formed by a direction of extension of the common line CML and the second direction Y is desirably smaller than an angle in the other area. Furthermore, in the area, the common line CML desirably extends in a direction substantially parallel to the second direction Y. It is thereby possible to prevent the common line CML and the second portion SLt of the signal line SL from interfering with each other.

Figure 20:
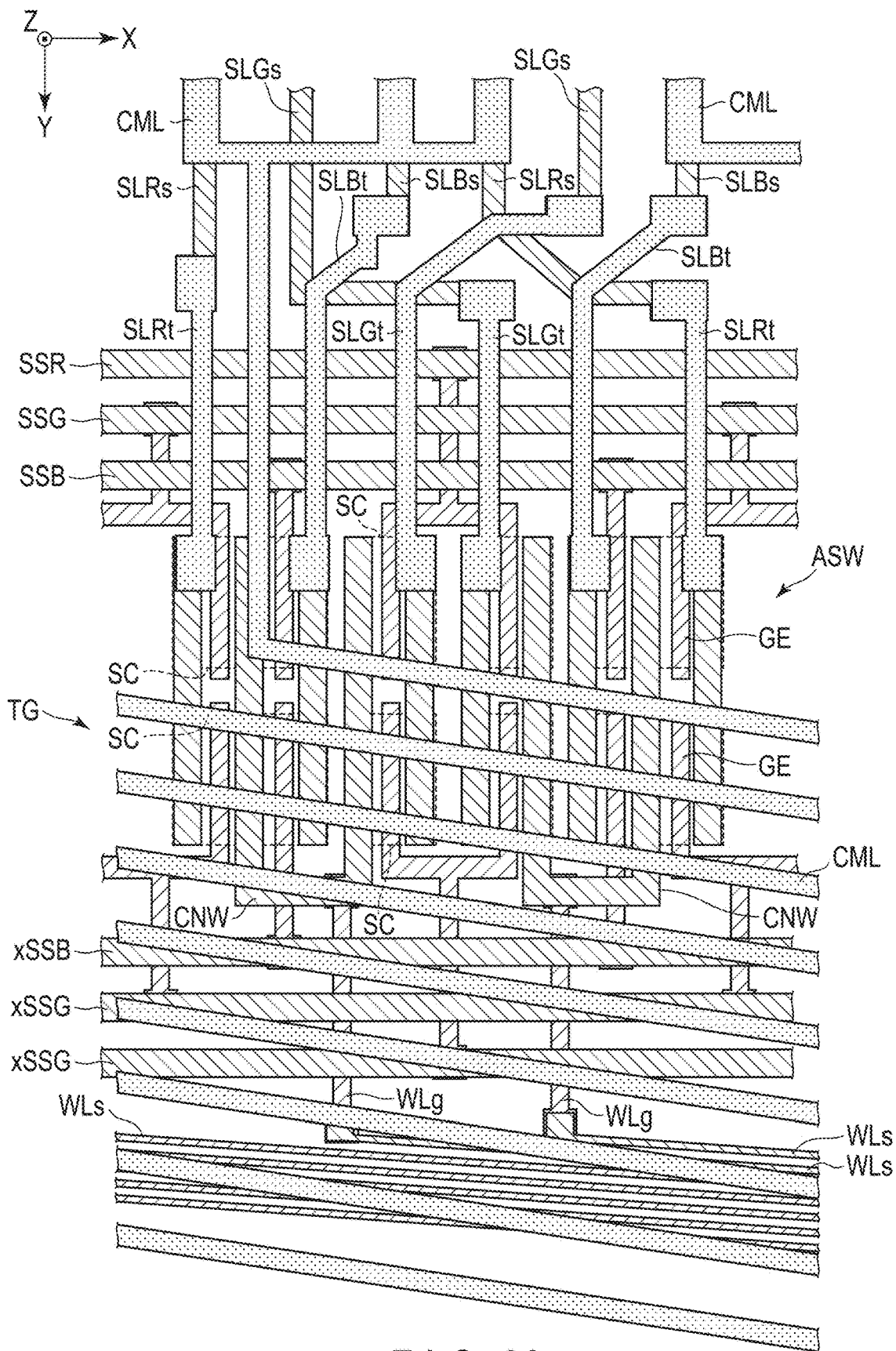
FIG. 20 is a plan view showing the signal line switch circuit of another configuration example.

FIG. 20 is a plan view of the signal line switch circuit of the configuration example. In the example shown in FIG. 20, a wiring layer with right upward diagonal lines is the first wiring layer Wg, a wiring layer with left upward diagonal lines is the second wiring layer Ws, and a wiring layer with dots is the third wiring layer Wt. In addition, the signal line switch circuit ASW shown in FIG. 20 is divided into layers or constituent elements in FIG. 21 to FIG. 26 to make the circuit easier to understand.

Figure 21:
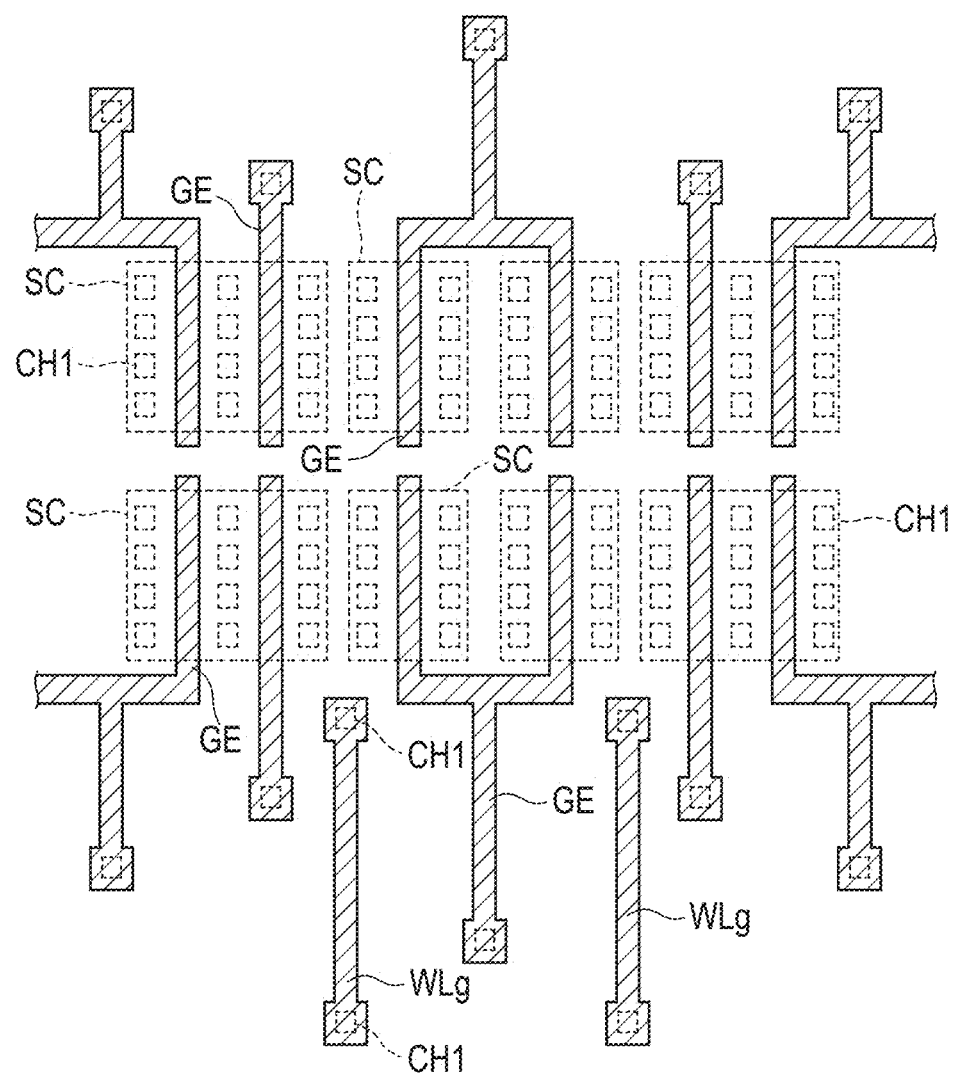
FIG. 21 is a plan view showing a constituent element formed by a semiconductor layer and a first wiring layer of FIG. 20.
Figure 22:
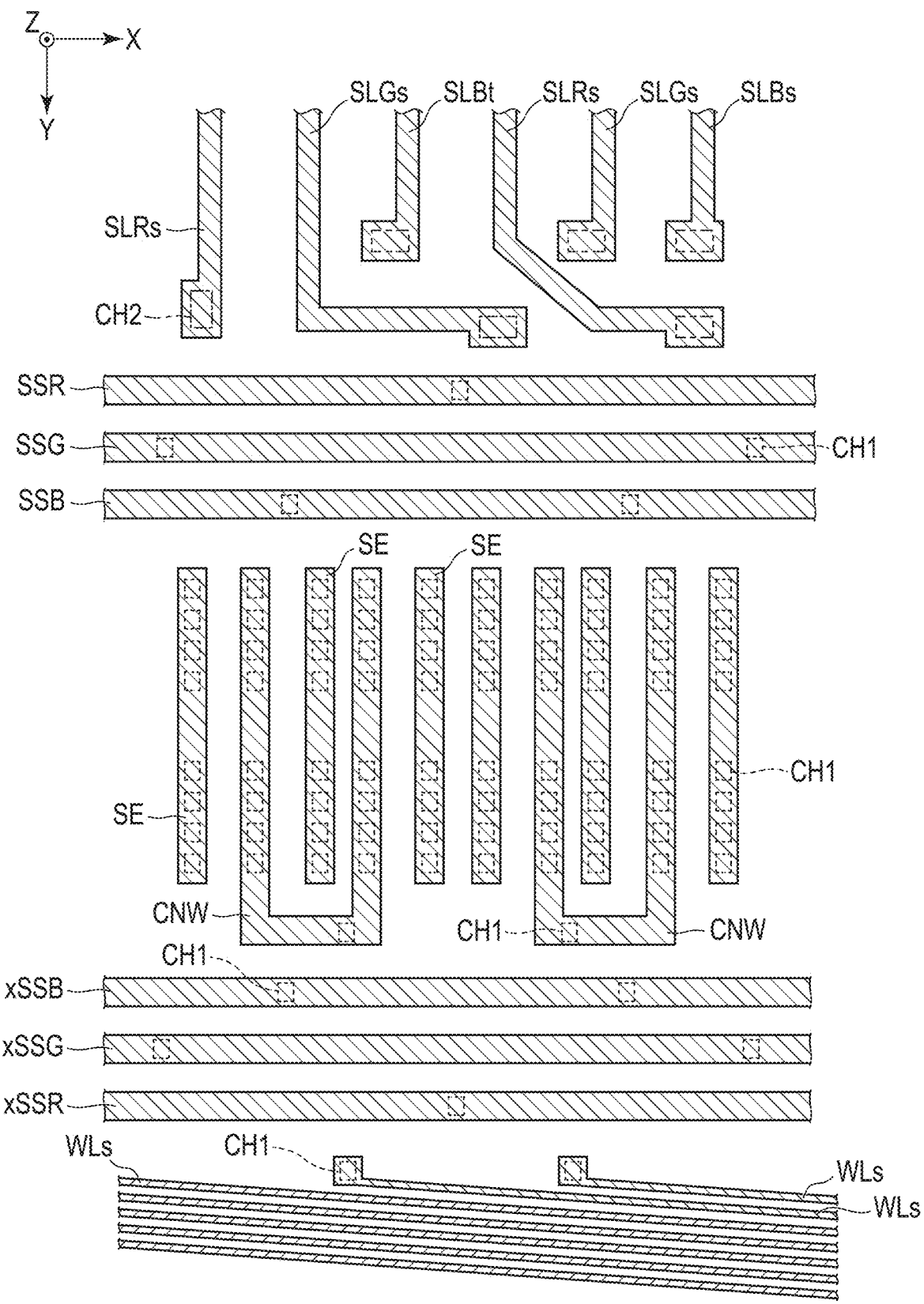
FIG. 22 is a plan view showing a constituent element formed by a second wiring layer of FIG. 20.
Figure 23:
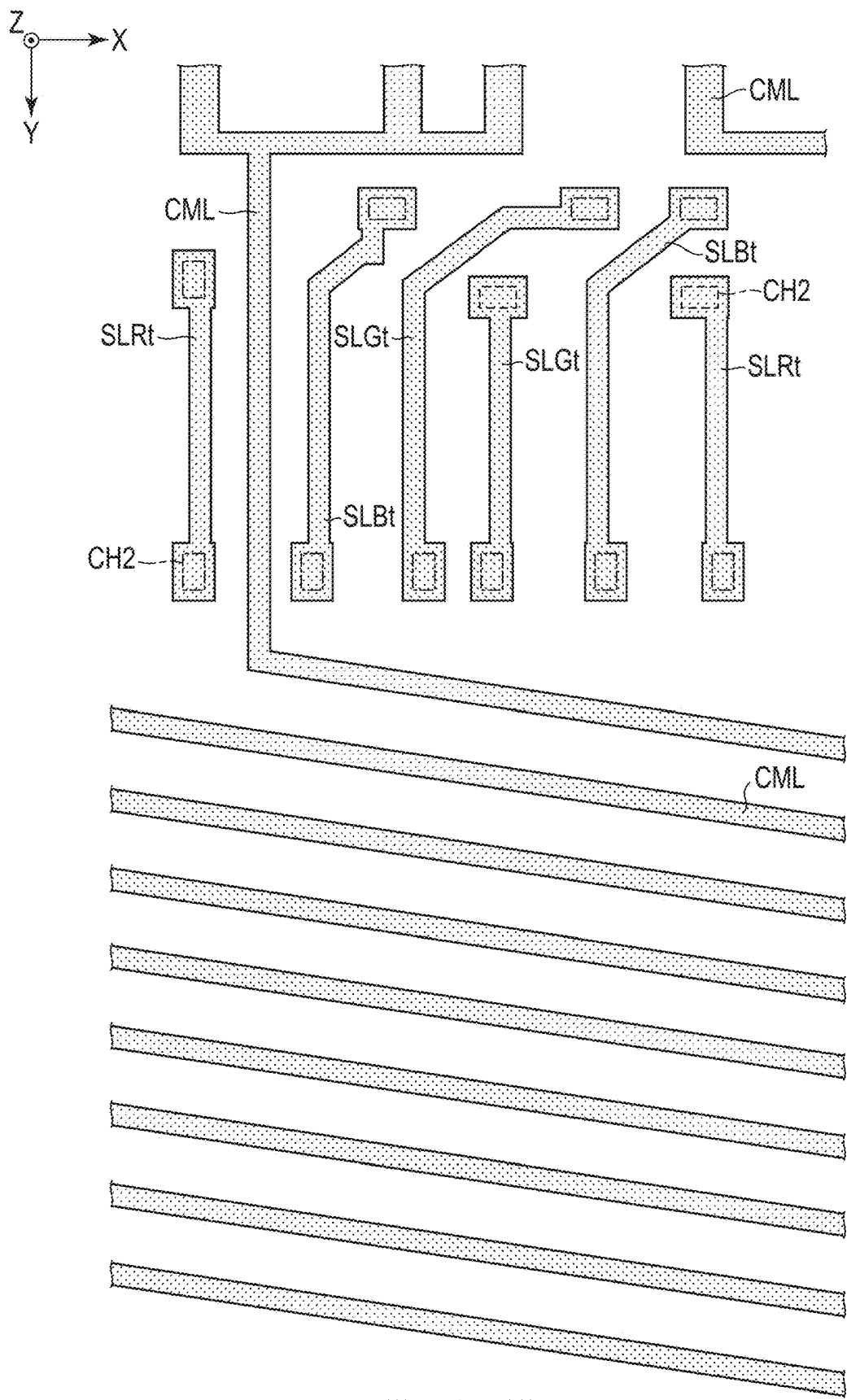
FIG. 23 is a plan view showing a constituent element formed by a third wiring layer of FIG. 20.
Figure 24:
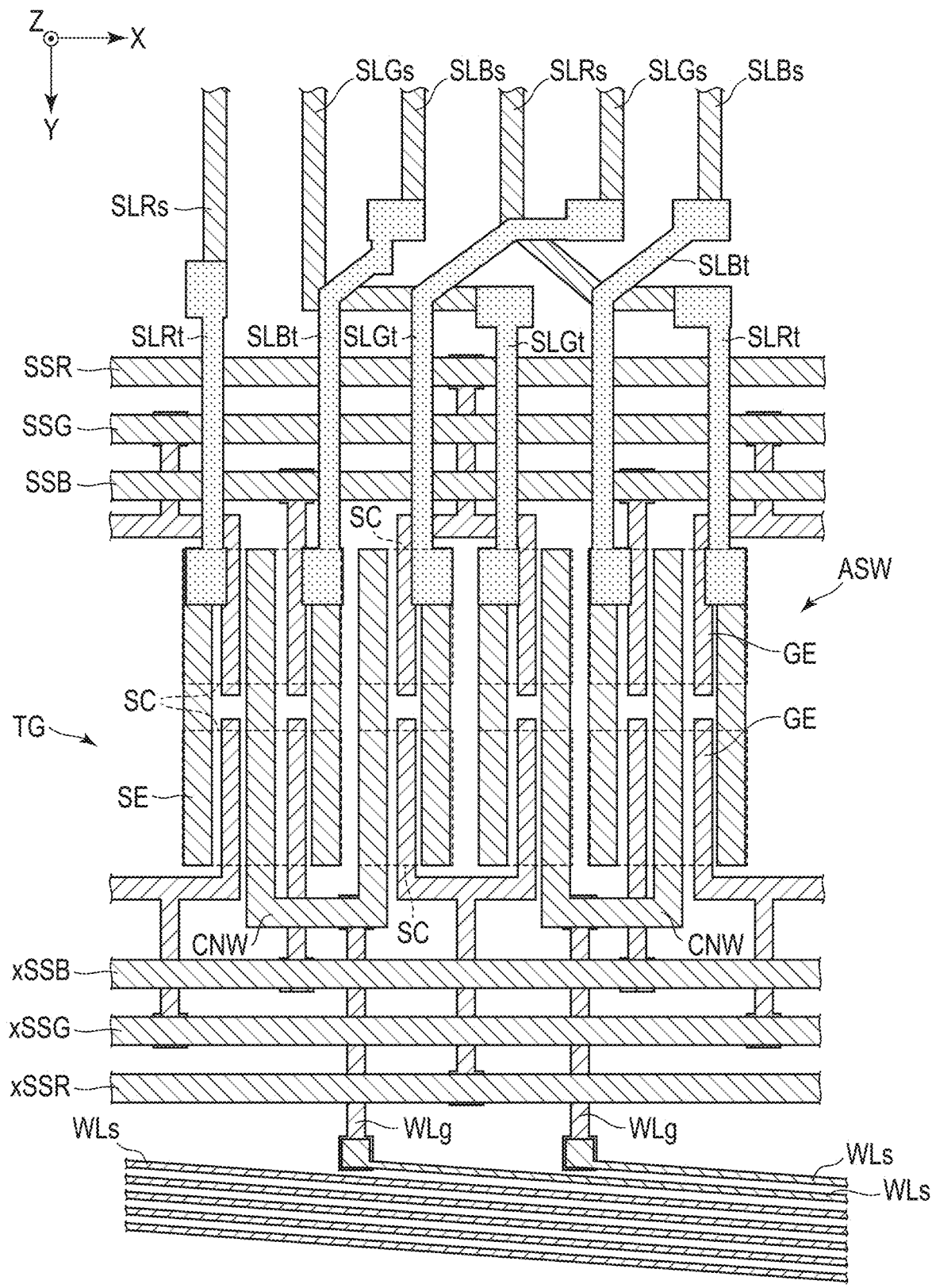
FIG. 24 is a plan view showing a transmission gate including a gate electrode and a source electrode, a signal line, and a lead line of FIG. 20.
Figure 25:
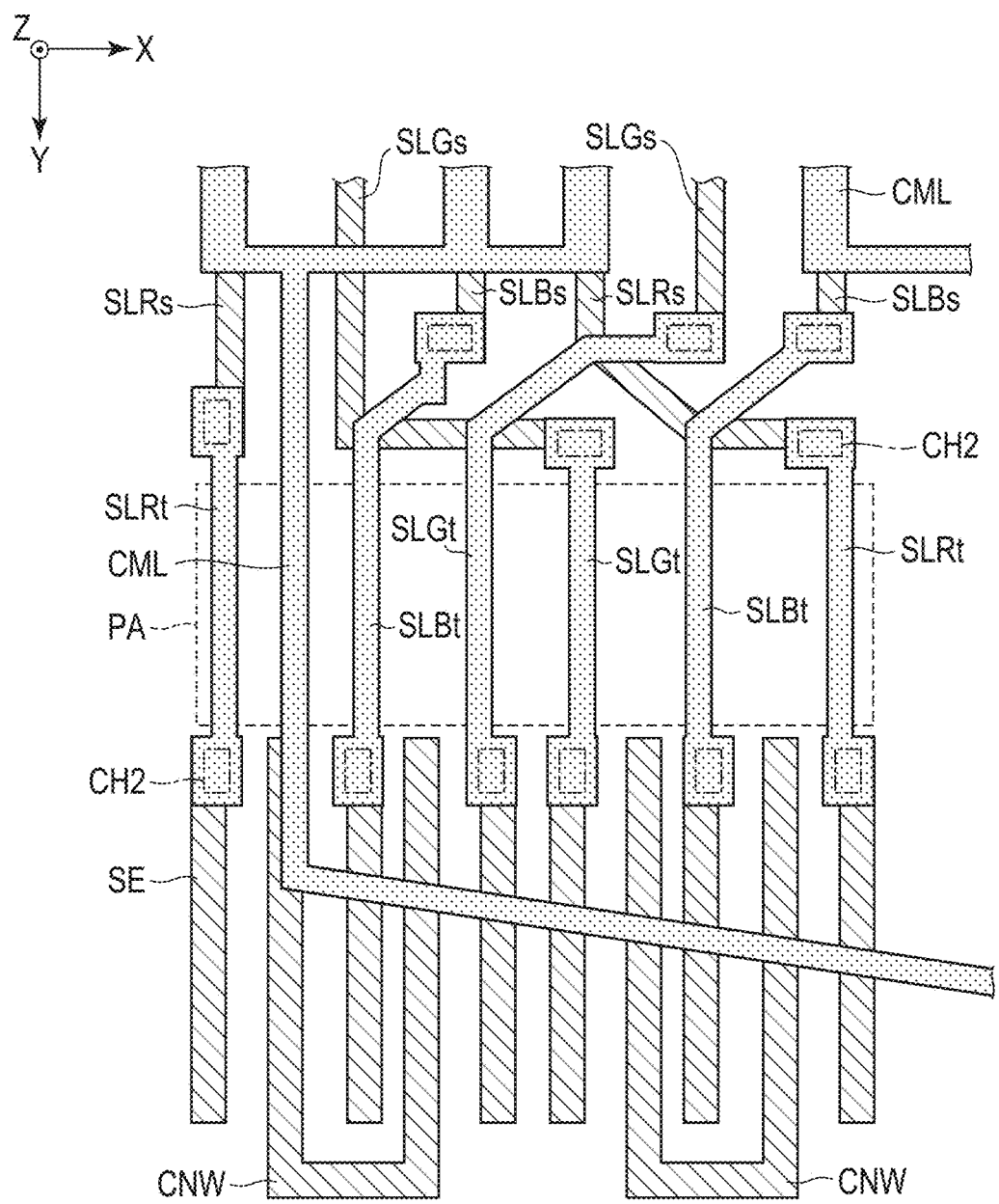
FIG. 25 is a plan view showing a signal line and a common line.
Figure 26:
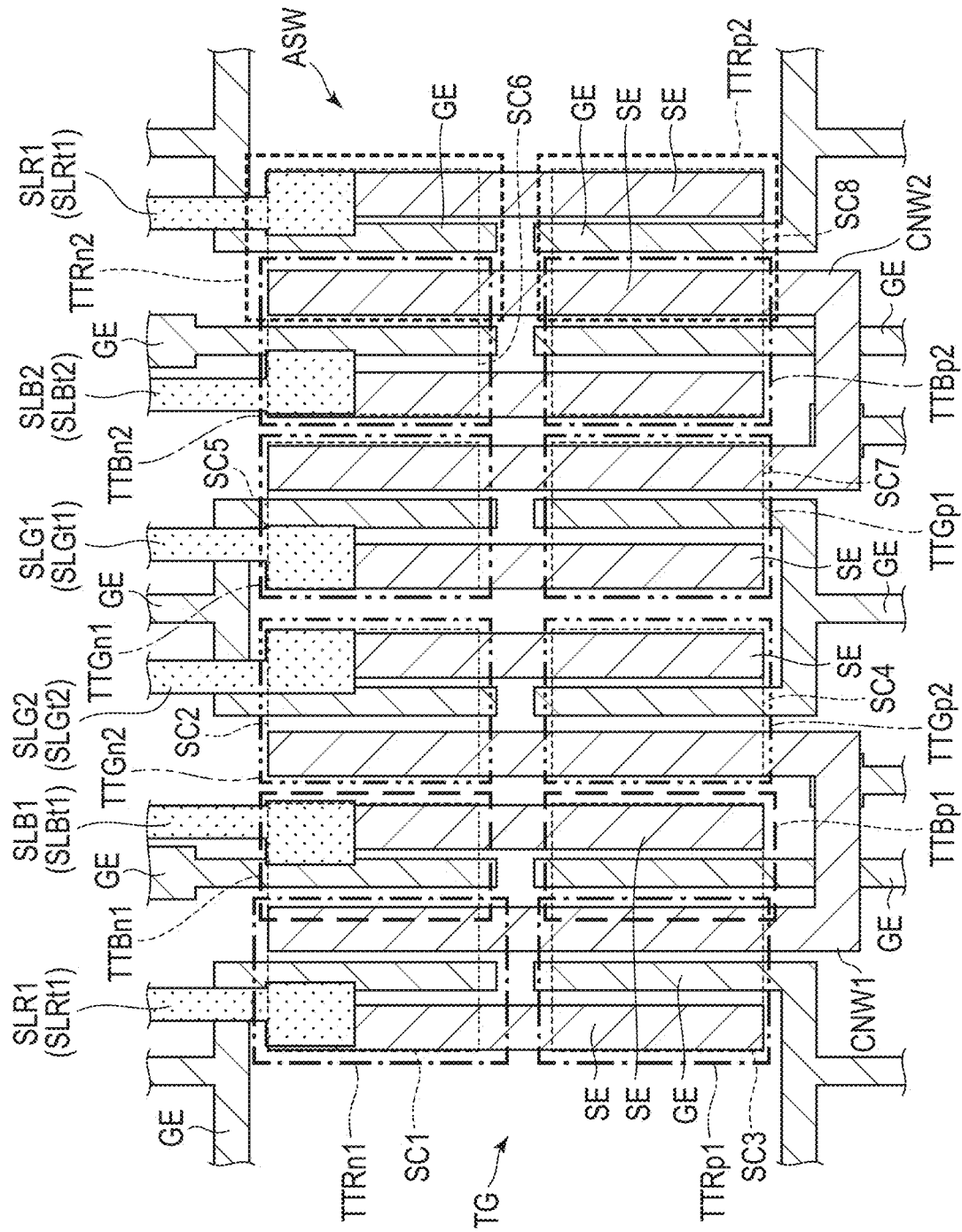
FIG. 26 is an enlarged view showing a part of FIG. 20.

FIG. 21 is a plan view showing the constituent elements formed by the semiconductor layer SC and the first wiring layer Wg in FIG. 20. FIG. 22 is a plan view showing the constituent elements formed by the second wiring layer Ws in FIG. 20. FIG. 23 is a plan view showing the constituent elements formed by the third wiring layer Wt in FIG. 20. FIG. 24 is a plan view showing a transmission gate TG including the gate electrodes GE and the source electrodes SE, signal lines SL (signal lines SLs and signal lines SLt), and the lead lines CNW in FIG. 20. FIG. 25 is a plan view showing the signal lines SL (signal lines SLs and signal lines SLt), and the common lines WL (common lines WLt and common lines WLg). FIG. 26 is an enlarged view showing a part of FIG. 20.

In FIG. 20 to FIG. 26, for example, several constituent elements such as contact holes may be omitted in order to make the drawings easier to see.

The signal line switch circuit ASW shown in FIG. 20 has a stacked structure similar to that in FIG. 13. In other words, the circuit includes on the base BA1, the insulating layer UC, the semiconductor layer SC, the insulating layer GI, the gate electrode GE, the insulating layer ILI, the lead wiring CNW (also referred to as the drain electrode DE), the source electrode SE, the insulating layer HRC1, the second portion SLt of the signal line SL, the insulating layer HRC2, and the insulating layer PAS.

The contact hole CH1 shown in FIG. 21 and FIG. 22 is a contact hole formed in the insulating layer ILI shown in FIG. 13.

The connection electrode CNW is connected to the semiconductor layer SC through the contact hole CH1. The connection electrode CNW is connected to the second portion WLg of the lead line WL through the contact hole CH1.

The source electrode SE is connected to the semiconductor layer SC through the contact hole CH1.

The selection lines SS (selection line SSR, selection line SSG, and selection line SSB) are connected to the gate electrodes GE through the contact holes CH1.

The first portions WLs of the lead lines WL are connected to the second portions WLg through the contact holes CH1.

The contact holes CH2 shown in FIG. 22, FIG. 23, and FIG. 25 are contact holes formed in the insulating layer HRC1.

The second portions SLt (second portion SLRt, second portion SLGt, and second portion SLBt) of the signal lines SL are connected to the first portions SLs (first portion SLRs, first portion SLGs, and first portion SLBs) of the signal lines SL through the contact holes CH2. The second portions SLt of the signal lines SL are connected to the source electrodes SE through the contact holes CH2.

In the configuration example, the first portion SLs and the second portion SLt of the signal line SL are connected to each other by the contact hole CH2 provided in the insulating layer HRC1 and are provided to be opposed to each other with the insulating layer HRC1 sandwiched therebetween. The parasitic capacitance between the first portion SLs and the second portion SLt of the signal line SL can be thereby reduced. The drive operation of the signal line switch circuit ASW becomes faster by reducing the parasitic capacitance. The display quality of the display device DSP can be thereby improved.

In addition, in the configuration example, as shown in FIG. 25, the area PA where the common line CML and the second portion SLt are provided adjacent to each other, is provided, similarly to FIG. 15. In the area PA, the common line CML and the second portion SLt are desirably arranged substantially parallel to each other. Furthermore, the common line CML and the second portion SLt are desirably extended in a direction substantially parallel to the second direction Y. It is thereby possible to prevent the common line CML and the second portion SLt of the signal line SL from interfering with each other.

In the configuration example, too, the display device DSP is driven by the column inversion drive similarly to the embodiment. In the signal line switch circuit ASW of the configuration example, the positions of the transmission gates TGG are replaced as shown in, for example, FIG. 18, FIG. 19, and FIG. 26.

The signal lines SL shown in FIG. 18, FIG. 19, and FIG. 26 are arranged in the order of the signal line SLR1, the signal line SLG1, the signal line SLB1, the signal line SLR2, the signal line SLG2, and the signal line SLB2 along the first direction X.

In contrast, the transmission gates TG are arranged in the order of the transmission gate TGR1, the transmission gate TGB1, the transmission gate TGG2, transmission gate TGG1, the transmission gate TGB2, and the transmission gate TGR2 along the first direction X. In other words, in the signal line switch circuit ASW of the configuration example, the order of the transmission gate TGG2 and the transmission gate TGG1 is replaced.

As shown in FIG. 26, the transistor TTRn1 includes the semiconductor layer SC1, the gate electrode GE connected to the selection line SSR, the source electrode SE connected to the signal line SLR1, and the connection electrode CNW1.

The transistor TTBn1 includes the semiconductor layer SC1, the gate electrode GE connected to the selection line SSB, the source electrode SE connected to the signal line SLB1, and the connection electrode CNW1.

The transistor TTGn2 includes the semiconductor layer SC2, the gate electrode GE connected to the selection line SSG, the source electrode SE connected to the signal line SLG2, and the connection electrode CNW1.

The transistor TTRp1 includes the semiconductor layer SC3, and the gate electrode GE connected to the selection line xSSR, the source electrode SE connected to the signal line SLR1, and the connection electrode CNW1.

The transistor TTBp1 includes the semiconductor layer SC3, the gate electrode GE connected to the selection line xSSB, the source electrode SE connected to the signal line SLB1, and the connection electrode CNW1.

The transistor TTGp2 includes the semiconductor layer SC4, the gate electrode GE connected to the selection line xSSG, the source electrode SE connected to the signal line SLG2, and the connection electrode CNW1.

The transistor TTGn1 includes a semiconductor layer SC5, the gate electrode GE connected to the selection line SSG, the source electrode SE connected to the signal line SLG1, and the connection electrode CNW2.

The transistor TTBn2 includes a semiconductor layer SC6, the gate electrode GE connected to the selection line SSB, the source electrode SE connected to the signal line SLB2, and the connection electrode CNW2.

The transistor TTRn2 includes the semiconductor layer SC6, the gate electrode GE connected to the selection line SSR, the source electrode SE connected to the signal line SLR2, and the connection electrode CNW2.

The transistor TTGp1 includes a semiconductor layer SC7, the gate electrode GE connected to the selection line xSSG, the source electrode SE connected to the signal line SLG1, and the connection electrode CNW2.

The transistor TTBp2 includes a semiconductor layer SC8, the gate electrode GE connected to the selection line xSSB, the source electrode SE connected to the signal line SLB2, and the connection electrode CNW2.

The transistor TTRp2 includes the semiconductor layer SC8, and the gate electrode GE connected to the selection line xSSR, the source electrode SE connected to the signal line SLR2, and the connection electrode CNW2.

The transmission gate composed of the transistor TTRn1 and the transistor TTRp1 is referred to as a transmission gate TGR1. The transmission gate composed of the transistor TTGn2 and the transistor TTGp2 is referred to as a transmission gate TGG2. The transmission gate composed of the transistor TTBn1 and the transistor TTGp1 is referred to as a transmission gate TGB1.

The transmission gate composed of the transistor TTRn2 and the transistor TTRp2 is referred to as a transmission gate TGR2. The transmission gate composed of the transistor STGn1 and the transistor STGp1 is referred to as a transmission gate TGG1. The transmission gate composed of the transistor STBn2 and the transistor STGp2 is referred to as a transmission gate TGB2.

In FIG. 26, however, only a second portion SLRt1 formed by the third wiring layer Wt among the signal lines SLR1 is shown. Similarly, in FIG. 26, a second portion SLGt1 of the signal line SLG1, a second portion SLBt1 of the signal line SLB1, a second portion SLRt1 of the signal line SLR2, a second part SLGt2 of the signal line SLG2, and a second portion SLBt2 of the signal line SLB2 are shown.

In FIG. 26, too, signals having opposite polarities are input to the adjacent signal lines SL, similarly to FIG. 17. However, since the transmission gate TGG1 and the transmission gate TGG2 are replaced, the signal line SL to which the signals having the same polarity are input is connected to the same connection electrode CNW via the transmission gate TG. More specifically, the transmission gate TGR1, the transmission gate TGG2, and the transmission gate TGB1 connected to the signal line SLR1, the signal line SLG2, and the signal line SLB1 are commonly connected to the connection electrode CNW1. The transmission gate TGR2, the transmission gate TGG1, and the transmission gate TGB2 connected to the signal line SLR2, the signal line SLG1, and the signal line SLB2 are commonly connected to the connection electrode CNW2. In other words, the signal lines SL to which the signals having the same polarity are input are connected to the transmission gates TG connected to the same connection electrode CNW. Therefore, for example, by inputting the signals having the positive polarity to the connection electrode CNW1, the signals having the positive polarity are input to the signal line SLR1, the signal line SLG2, and the signal line SLB1, similarly to the embodiment. In addition, by inputting the signals having the negative polarity to the connection electrode CNW2, the signals having the negative polarity are input to the signal line SLR2, the signal line SLG1, and the signal line SLB2.

In other words, in the display device DSP of the configuration example, when the column inversion drive is executed, it is possible not to individually input the signals having the positive polarity and the negative polarity to the respective signal lines, but to input the signals having the same polarity via the connection electrodes CNW at once. The power consumption of the display device DSP can be thereby reduced.

In the signal line switch circuit ASW shown in FIG. 18 and FIG. 26, the transmission gate TGG1 and the transmission gate TGG2 corresponding to green (G) are replaced, but the present invention is not limited to this. The transmission gates corresponding to red (R) or blue (B) may be replaced.

In the configuration example, too, the same advantages as those in the above-described embodiment can be achieved.

In the present disclosure, the first portion WLs and the second portion WLg of the lead line WL may be referred to as a third portion and a fourth portion, respectively, in order to avoid confusion of the first portion SLs and the second portion SLt of the signal line SL. In addition, as regards the first wiring layer Wg, the second wiring layer Ws, and the third wiring layer Wt, when two of the three wiring layers are described, the two wiring layers may be referred to as the first wiring layer and the second wiring layer. For example, when the second wiring layer Ws and the third wiring layer Wt are compared and described, the second wiring layer Ws may be referred to as a first wiring layer, and the third wiring layer Wt may be referred to as a second wiring layer.

The insulating layer ILI, the insulating layer HRCT, and the insulating layer PAS shown in FIG. 3B may be referred to as a first insulating layer, a second insulating layer, and a third insulating layer, respectively. Of the surfaces of the insulating layer ILI, the surface which is in contact with the scanning line GL and the insulating layer GI is referred to as a first surface, and the surface which is in contact with the insulating layer HRC1 and which is on a side opposite to the first surface is referred to as a second surface.

In addition, in the present disclosure, R (red), G (green) and B (blue) may be referred to as a first color, a second color, and a third color, respectively. Accordingly, the sub-pixel SXR, the sub-pixel SXG, and the sub-pixel SXB may be referred to as a first sub-pixel, a second sub-pixel, and a third sub-pixel, respectively. In addition, the signal line SLR, the signal line SLG, and the signal line SLB may be referred to as a first signal line, a second signal line, and a third signal line, respectively.

In accordance with this, the transistor STR and the transmission gate TGR connected to the first signal line SLR may also be referred to as a first transistor, the transistor STG and the transmission gate TGG connected to the second signal line SLG may also be referred to as a second transistor, and the transistor STB and the transmission gate TGB connected to the third transistor SLB may also be referred to as a third transistor.

The transmission gate TGR, the transmission gate TGR, and the transmission gate TGB may also be referred to as a first transmission gate, a second transmission gate, and a third transmission gate, respectively.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a display area and a frame area surrounding the display area, which are provided on a first base;
    a plurality of sub-pixels provided in the display area;
    a plurality of scanning lines provided in the display area, connected to the plurality of sub-pixels, and formed by a first wiring layer;
    a plurality of signal lines provided in the display area, connected to the plurality of sub-pixels, and formed by a second wiring layer;
    a switch circuit provided in the frame area and connected to the plurality of signal lines;
    a plurality of sensor electrodes provided in the display area;
    a plurality of detection lines connected to the plurality of sensor electrodes and formed by a third wiring layer, and
    a lead line provided in the frame area and connected to the switch circuit, wherein
    the plurality of signal lines each includes a first portion and a second portion in the frame area,
    the second portion of the signal line is provided between the display area and the switch circuit, and drawn from the switch circuit toward the display area,
    the first portion of the signal line is formed by the second wiring layer, provided between the second portion and the display area, and connected to the second portion,
    the second portion of the signal line and each of the plurality of detection lines are formed by the third wiring layer,
    the second portions of the plurality of signal lines and the plurality of detection lines are provided substantially parallel to each other,
    the lead line includes a third portion and a fourth portion,
    the third portion of the lead line is formed by the second wiring layer,
    the fourth portion of the lead line is formed by the first wiring layer,
    the fourth portion is located between the third portion and the switch circuit,
    the switch circuit is located between the second portion and the fourth portion, and
    the third portion is connected to the fourth portion.

2. The display device according to claim 1, wherein
    the third wiring layer is located above the first wiring layer with the second wiring layer sandwiched therebetween, and
    the second portion of the signal line is located above the first portion of the signal line.

3. The display device according to claim 1, wherein
    the third wiring layer is located above the second wiring layer with an organic insulating layer sandwiched therebetween, and
    the first portion and the second portion are connected to each other through a contact hole formed in the organic insulating layer.

4. The display device according to claim 1, wherein
    the switch circuit includes an n-channel transistor and a p-channel transistor.

5. The display device according to claim 1, wherein the switch circuit includes a transmission gate.

6. The display device according to claim 1, wherein the plurality of signal lines include a first signal line, a second signal line, and a third signal line,
the switch circuit includes a first transistor connected to the first signal line, a second transistor connected to the second signal line, and a third transistor connected to the third signal line, and
the lead line is connected to the first transistor, the second transistor, and the third transistor.

7. The display device according to claim 1, further comprising:
a display function layer, wherein
the plurality of sub-pixels include a plurality of pixel electrodes, and
the display function layer is driven by an electric field generated between the plurality of pixel electrodes and the plurality of sensor electrodes.

8. The display device according to claim 1, wherein
a drive signal is input during a touch detection period, and a certain DC voltage is input during a display period, to the plurality of sensor electrodes, via the plurality of detection lines.

9. A display device comprising:
a display area and a frame area surrounding the display area, which are provided on a first base;
at least a first pixel, a second pixel, and a third pixel, which are provided in the display area;
a first signal line connected to the first pixel;
a second signal line connected to the second pixel;
a third signal line connected to the third pixel;
a switch circuit provided in the frame area and connected to the first signal line, the second signal line, and the third signal line; and
a lead line connected to the switch circuit, wherein
the switch circuit includes a first transistor connected to the first signal line, a second transistor connected to the second signal line, and a third transistor connected to the third signal line,
the lead line is connected to the first transistor, the second transistor, and the third transistor,
each of the first signal line, the second signal line, and the third signal line includes a first portion and a second portion,
the lead line includes a third portion and a fourth portion,
the fourth portion of the lead line is formed by a first wiring layer,
the first portion of each of the first signal line, the second signal line, and the third signal line, and the third portion of the lead line are formed by a second wiring layer located above the first wiring layer with an inorganic insulating layer sandwiched therebetween,
the second portion of each of the first signal line, the second signal line, and the third signal line is formed by a third wiring layer located above the second wiring layer with an organic insulating layer sandwiched therebetween, and
the fourth portion is located between the third portion and the switch circuit,
the switch circuit is located between the second portion and the fourth portion, and
the third portion is connected to the fourth portion.

10. The display device according to claim 9, further comprising:
a pixel electrode provided in each of the first pixel, the second pixel, and the third pixel;
a common electrode arranged opposite to the pixel electrode;
a common line connected to the common electrode; and
a display function layer, wherein
the display function layer is driven by an electric field generated between the pixel electrode and the common electrode.

11. The display device according to claim 10, wherein
a drive signal is input during a touch detection period and a certain DC voltage is input during a display period, to the common electrode, via the common line.

12. The display device according to claim 10, wherein
the common line is formed by the third wiring layer.

13. A display device comprising:
a plurality of sensor electrodes arrayed in a matrix in a display area;
a common line connected to each of the plurality of sensor electrodes;
a plurality of signal lines arranged in a first direction in a display area and formed by a second wiring layer; and
an analog switch circuit provided in a frame area surrounding the display area and connected to the plurality of signal lines, and
a lead line provided in the frame area and connected to the analog switch circuit, wherein
a first signal line that is one of the plurality of signal lines includes a first portion and a second portion in the frame area,
the second portion is connected to a drain of a transistor included in the analog switch circuit and drawn toward the display area,
the first portion is located between the second portion and the display area and connected to the second portion,
the second portion is a wiring portion formed of a same material in a same layer as the common line, and
the first portion is a wiring portion formed of a same material in a same layer as a plurality of signal lines in the display area,
the plurality of signal lines are formed by the second wiring layer, which is a different layer from the common line,
the lead line includes a third portion and a fourth portion,
the third portion of the lead line is formed by the second wiring layer,
the fourth portion of the lead line is formed by a first wiring layer, which is a different layer from each of the second wiring layer and common line,
the fourth portion is located between the third portion and the analog switch circuit,
the analog switch circuit is located between the second portion and the fourth portion, and
the third portion is connected to the fourth portion.

14. The display device according to claim 13, further comprising:
a base;
a first insulating layer provided on the base; and
a second insulating layer stacked on the first insulating layer, wherein
the transistor is provided between the base and the first insulating layer,
the second portion is provided between the first insulating layer and the second insulating layer, and
the second portion is connected to the drain through a contact hole formed in the first insulating layer.

15. The display device according to claim 14, wherein
the first insulating layer includes a first surface and a second surface on a side opposite to the first surface, the second insulating layer is in contact with the second surface, the plurality of signal lines in the display area and the first portion in the frame area are in contact with the first surface, the common line in the display area and the second portion in the frame area are in contact with the second surface, and the first portion and the second portion are connected to each other through a contact hole formed in the first insulating layer.

16. The display device according to claim 15, further comprising:

a third insulating layer stacked on the second insulating layer;

an alignment film covering the third insulating layer; and a plurality of pixel electrodes, wherein the plurality of sensor electrodes are provided between the second insulating layer and the third insulating layer, the plurality of pixel electrodes are provided between the third insulating layer and the alignment film, in the display area, and the sensor electrode is connected to the common line through a contact hole formed in the second insulating layer, in the display area.

17. The display device according to claim 16, wherein the first insulating layer and the second insulating layer are organic insulating layers, and the third insulating layer is an inorganic insulating layer.

* * * * *